United States Patent
Ishii et al.

(10) Patent No.: US 10,225,168 B2
(45) Date of Patent: Mar. 5, 2019

(54) INTERFACE APPARATUS AND MEMORY BUS SYSTEM

(71) Applicant: Panasonic Corporation, Osaka (JP)

(72) Inventors: Tomoki Ishii, Kyoto (JP); Takao Yamaguchi, Osaka (JP); Atsushi Yoshida, Osaka (JP); Satoru Tokutsu, Saitama (JP); Yuuki Soga, Kyoto (JP)

(73) Assignee: Panasonic Intellectual Property Management Co. Ltd, Osaka (JP)

( * ) Notice: Subject to any disclaimer, the term of this patent is extended or adjusted under 35 U.S.C. 154(b) by 515 days.

(21) Appl. No.: 14/468,653

(22) Filed: Aug. 26, 2014

(65) Prior Publication Data

US 2014/0365632 A1    Dec. 11, 2014

Related U.S. Application Data

(63) Continuation of application No. PCT/JP2013/006786, filed on Nov. 19, 2013.

(30) Foreign Application Priority Data

Dec. 28, 2012    (JP) ................................. 2012-287016

(51) Int. Cl.
  *G06F 15/16*   (2006.01)
  *H04L 12/26*   (2006.01)
  *H04L 29/08*   (2006.01)
  *G06F 13/16*   (2006.01)

(52) U.S. Cl.
  CPC .......... *H04L 43/08* (2013.01); *G06F 13/1663* (2013.01); *H04L 67/147* (2013.01)

(58) Field of Classification Search
  CPC .............................. H04L 43/08; G06F 13/1663
  See application file for complete search history.

(56) References Cited

U.S. PATENT DOCUMENTS

2005/0066135 A1    3/2005    Yoshida
2005/0177677 A1    8/2005    Jeddeloh
2007/0115939 A1    5/2007    Lee et al.
(Continued)

FOREIGN PATENT DOCUMENTS

JP    2000-187615 A    7/2000
JP    2007-526559 T    9/2007
(Continued)

OTHER PUBLICATIONS

International Search Report for corresponding International Application No. PCT/JP2013/006786 dated Feb. 10, 2014.

*Primary Examiner* — Suraj M Joshi
*Assistant Examiner* — Joel Mesa
(74) *Attorney, Agent, or Firm* — Renner Otto Boisselle and Sklar

(57) ABSTRACT

An exemplary interface apparatus includes: a header generator which receives, in a first order, a plurality of request headers extracted from a plurality of request packets, generates response headers associated with the request headers, and then stores the response headers so that the response headers are read in the first order; and a header order controller which controls the header generator so that if the plurality of request data have been transmitted to the memory in a second order, the respective response headers are read in the second order.

12 Claims, 18 Drawing Sheets

(56) References Cited

U.S. PATENT DOCUMENTS

| | | | |
|---|---|---|---|
| 2007/0198771 A1* | 8/2007 | Seo | G06F 13/1626 |
| | | | 711/106 |
| 2008/0294862 A1 | 11/2008 | Jeddeloh | |
| 2008/0320254 A1 | 12/2008 | Wingard et al. | |
| 2008/0320255 A1 | 12/2008 | Wingard et al. | |
| 2008/0320268 A1 | 12/2008 | Wingard et al. | |
| 2008/0320476 A1 | 12/2008 | Wingard et al. | |
| 2009/0248999 A1 | 10/2009 | Kusachi | |
| 2009/0313441 A1 | 12/2009 | Mochida et al. | |
| 2012/0079352 A1* | 3/2012 | Frost | G06F 11/1008 |
| | | | 714/767 |

FOREIGN PATENT DOCUMENTS

| | | |
|---|---|---|
| JP | 2009-237872 A | 10/2009 |
| JP | 4485574 B | 4/2010 |
| JP | 2010-531518 T | 9/2010 |
| JP | 2012-078895 A | 4/2012 |

\* cited by examiner

WRITE REQUEST PACKET

READ REQUEST PACKET

WRITE RESPONSE PACKET

READ RESPONSE PACKET

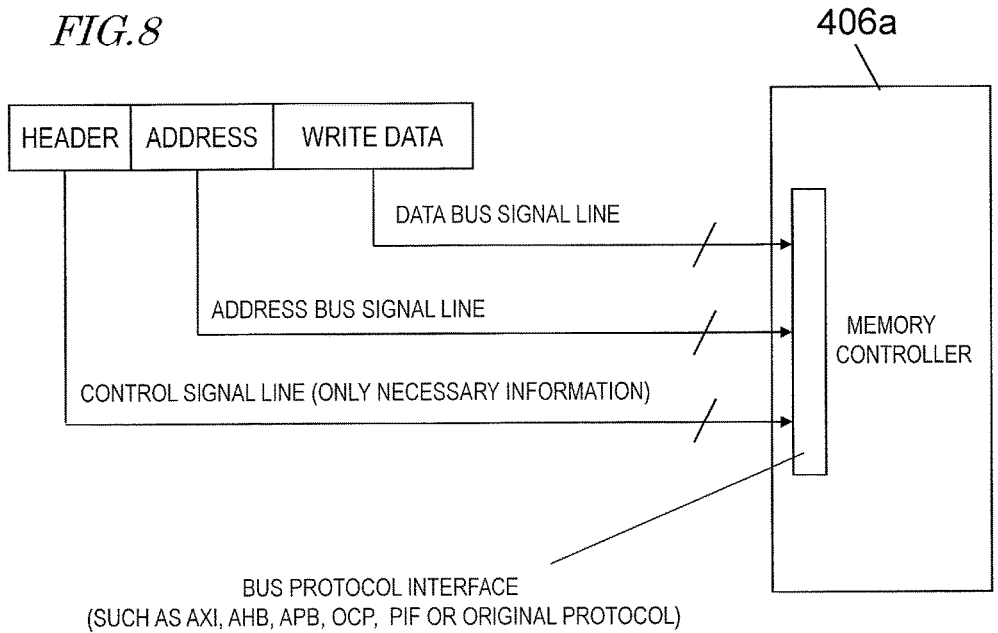
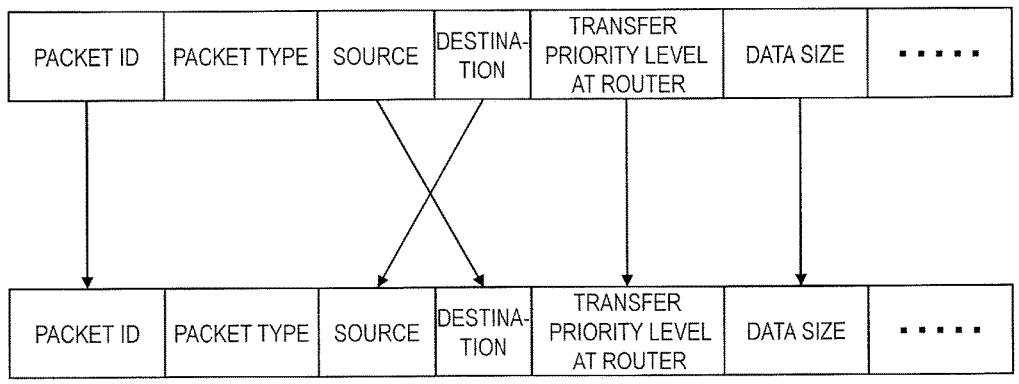

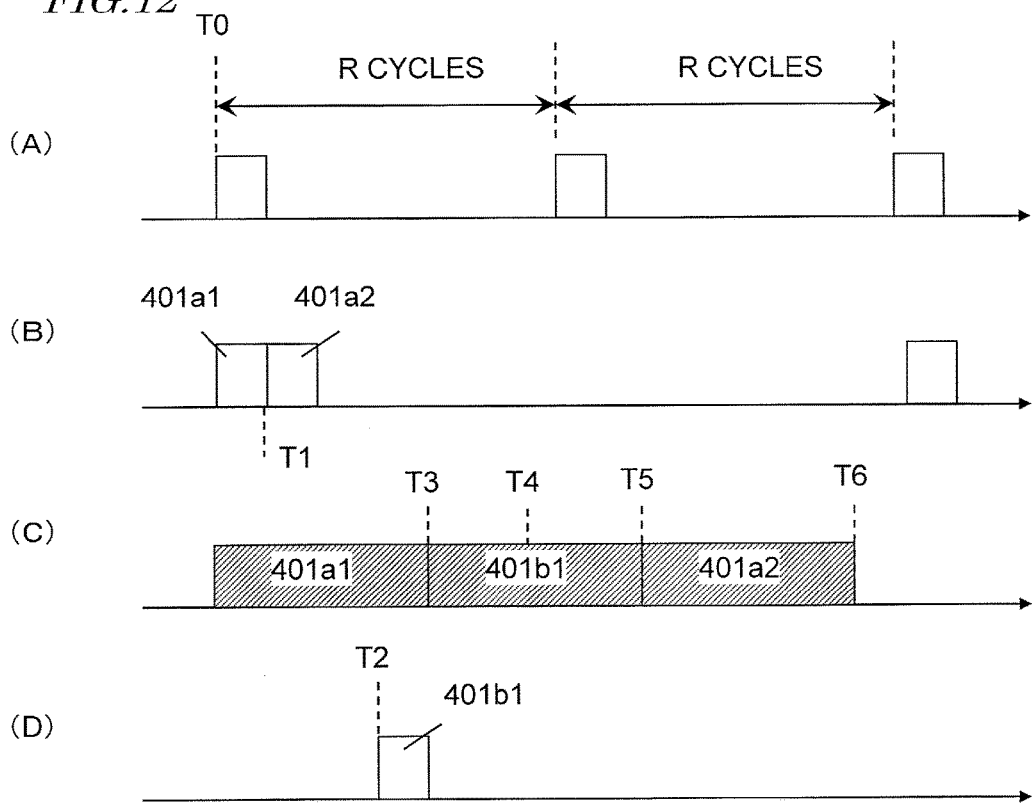

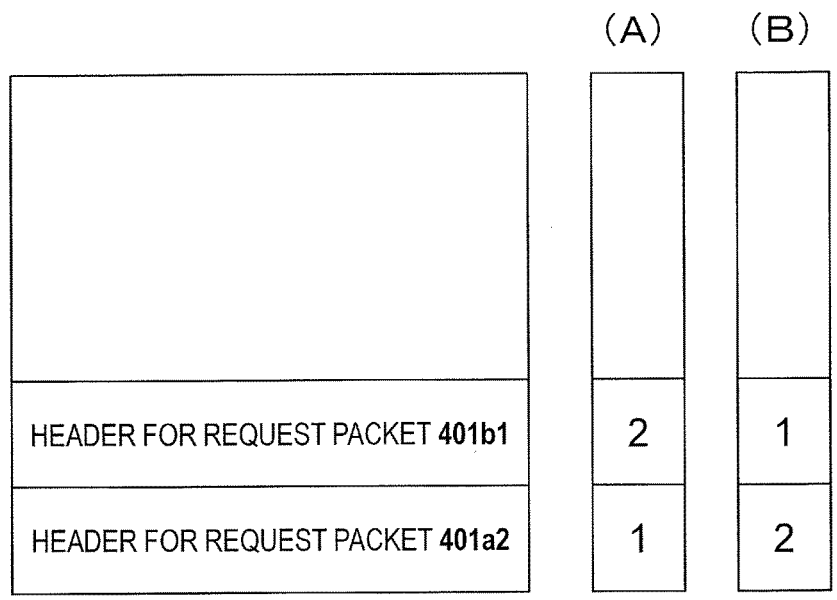

FIG.25

| ORDER OF REQUESTS | ACCESS TARGET'S ADDRESS | READ OR WRITE |
|---|---|---|
| 1 | 0000h | READ |
| 2 | 8000h | WRITE |
| 3 | 8000h | READ |

FIG.26

| BANK NUMBER | ROW ADDRESS | COLUMN ADDRESS | ACCESS TARGET'S ADDRESS |
|---|---|---|---|
| 0 | 00h | 00h | 0000h |
| 1 | 80h | 00h | 8000h |

FIG.27

| ORDER OF REQUESTS | ACCESS TARGET'S ADDRESS | READ OR WRITE |
|---|---|---|
| 1 | 0000h | READ |
| 2 | 8000h | READ |

INTERFACE APPARATUS AND MEMORY BUS SYSTEM

This is a continuation of International Application No. PCT/JP2013/006786, with an international filing date of Nov. 19, 2013, which claims priority of Japanese Patent Application No. 2012-287016, filed on Dec. 28, 2012, the contents of which are hereby incorporated by reference.

BACKGROUND

1. Technical Field

The present application relates to an apparatus, method and program for controlling a networked communications bus for use in a semiconductor chip.

2. Description of the Related Art

Recently, in the fields of built-in computers and general-purpose processors which use an SoC (System on Chip), there is a growing demand for semiconductor chips with enhanced performance. And as the performance of a semiconductor chip has been enhanced these days to meet such a demand, the requested bandwidth of data to be transferred through communications buses on the chip has increased so much that the bandwidth of the communications buses needs to be increased, too. In order to broaden the bandwidth of a communications bus at a low bus operating frequency, a lot of people have paid much attention these days to a Network-on-chip (NoC) which shares a bus line between multiple processors and which can contribute to using given resources more efficiently.

Japanese Patent No. 4485574 discloses a method for increasing the promptness of response to memory access requests in a general SoC configuration in which a plurality of initiators and memory controllers are connected together via an NoC and in which there are both rate-ensured initiators which need to ensure an access at a constant rate during a predetermined period and non-rate-ensured initiators which submit access requests to a memory at irregular, non-easily-predictable intervals.

FIG. 1 illustrates a configuration for the SoC disclosed in Japanese Patent No. 4485574. On detecting an access request submitted by a rate-ensured initiator 201, an access management section 203 in a memory controller 206 checks out the number of times of accesses to determine whether or not this is an access at a predetermined rate or less, and keeps the decision result on record and manages the record. Only when there is no access request submitted by any other initiator 202, an access arbitrator 205 approves the access request at the predetermined rate or more that has been submitted by the rate-ensured initiator 201. If the access arbitrator 205 detects an access request submitted by the non-rate-ensured initiator 202 before providing arbitration for the access request from the rate-ensured initiator 201, then the access arbitrator 205 provides arbitration for the access request from the non-rate-ensured initiator 202 earlier than the access request from the rate-ensured initiator 201. The order of arbitration is reversed because the rate-ensured initiator 201 has already made accesses at the predetermined rate or more. By performing such processing, the promptness of response to the access request from the non-rate-ensured initiator 202 can be increased.

SUMMARY

There is a growing demand for further increasing the memory access efficiency by changing the order of accesses in a memory controller.

One aspect of the present invention provides an interface apparatus which connects together a memory controller that is connected to a memory on an integrated circuit and a bus network that has been formed on the integrated circuit. The memory controller includes: an arbitrator which provides arbitration in the order of processing of a plurality of request data; and a transmitter which transmits respective response data that have been output from the memory in response to those request data to the interface apparatus. The interface apparatus includes: a de-packetizing processor which performs de-packetize processing on each of the request packets that have been received from the bus network and which extracts and outputs a request header and request data from each of the request packets; a header generator which receives, in a first order, the plurality of request headers that the de-packetizing processor has output, sequentially generates response headers associated with the request headers, and then stores the response headers so that the response headers are read in the first order; a packetizing processor which generates response packets based on the response data that has been output from the memory in response to the request data and the response headers that are stored in the header generator and which transmits the response packets to the bus network; and a header order controller which controls the header generator so that if the arbitrator has transmitted the plurality of request data to the memory in a second order which is different from the first order, the respective response headers are read in the second order.

Even if the order of requests has been changed in a memory, an interface apparatus according to an aspect of the present invention can still maintain proper correspondence between the response headers and the response data and can ensure that the system works properly. In addition, the interface apparatus can also increase the memory access efficiency just by changing the order of accesses in the memory controller without raising the operating frequency or broadening the bus width. On top of that, by getting notified of the order of requests by the memory controller before accesses to the memory are finished, the processing of searching for response headers and the router's processing on the response headers can be performed in parallel with the processing of accessing the memory. As a result, the delay in the response header search processing can be covered and the promptness of response of the initiator can be increased.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

Figure 3:
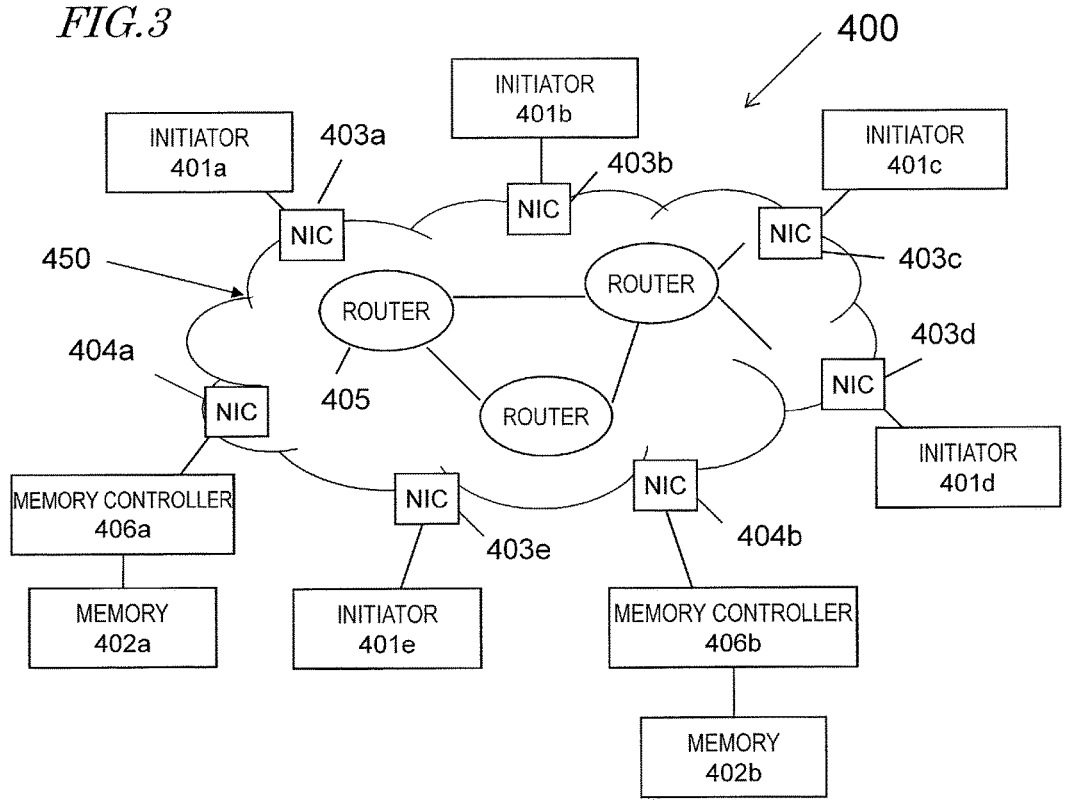
FIG. 3 illustrates the structure of an SoC 400.
Figure 6:
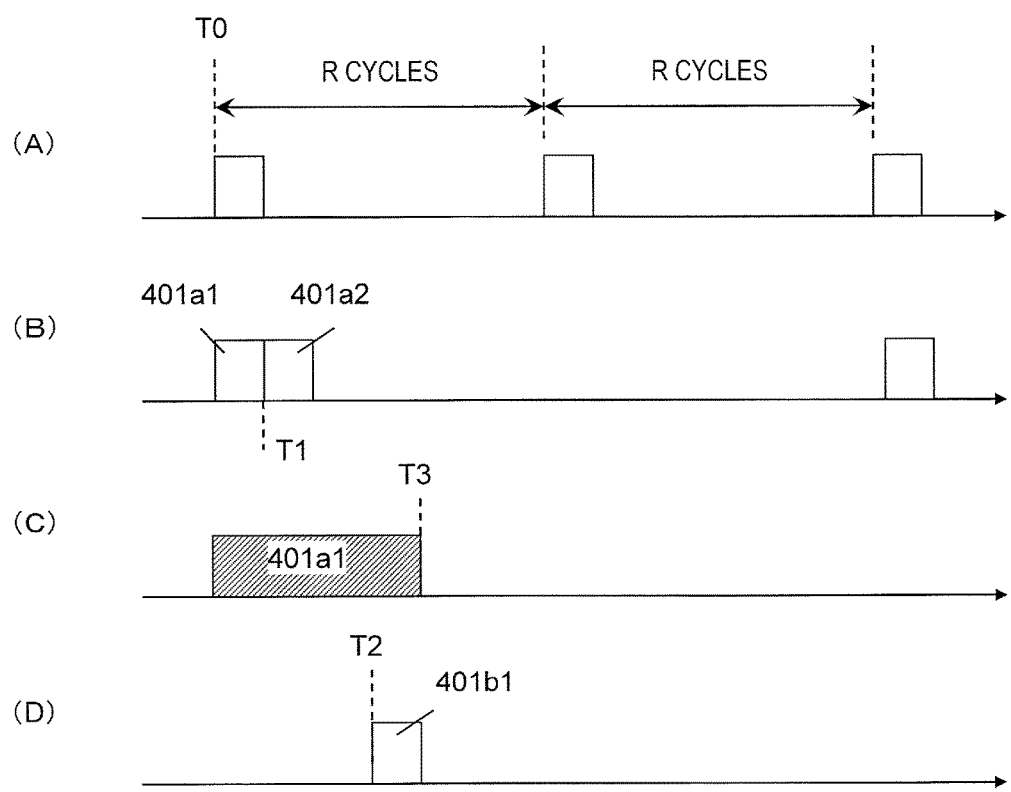

Portions (A) through (D) of FIG. 6 show the flow of data processing to be performed when the rate-ensured initiator 401a and non-rate-ensured initiator 401b shown in FIG. 3 are attempting to access a memory 402a.

Figure 7:
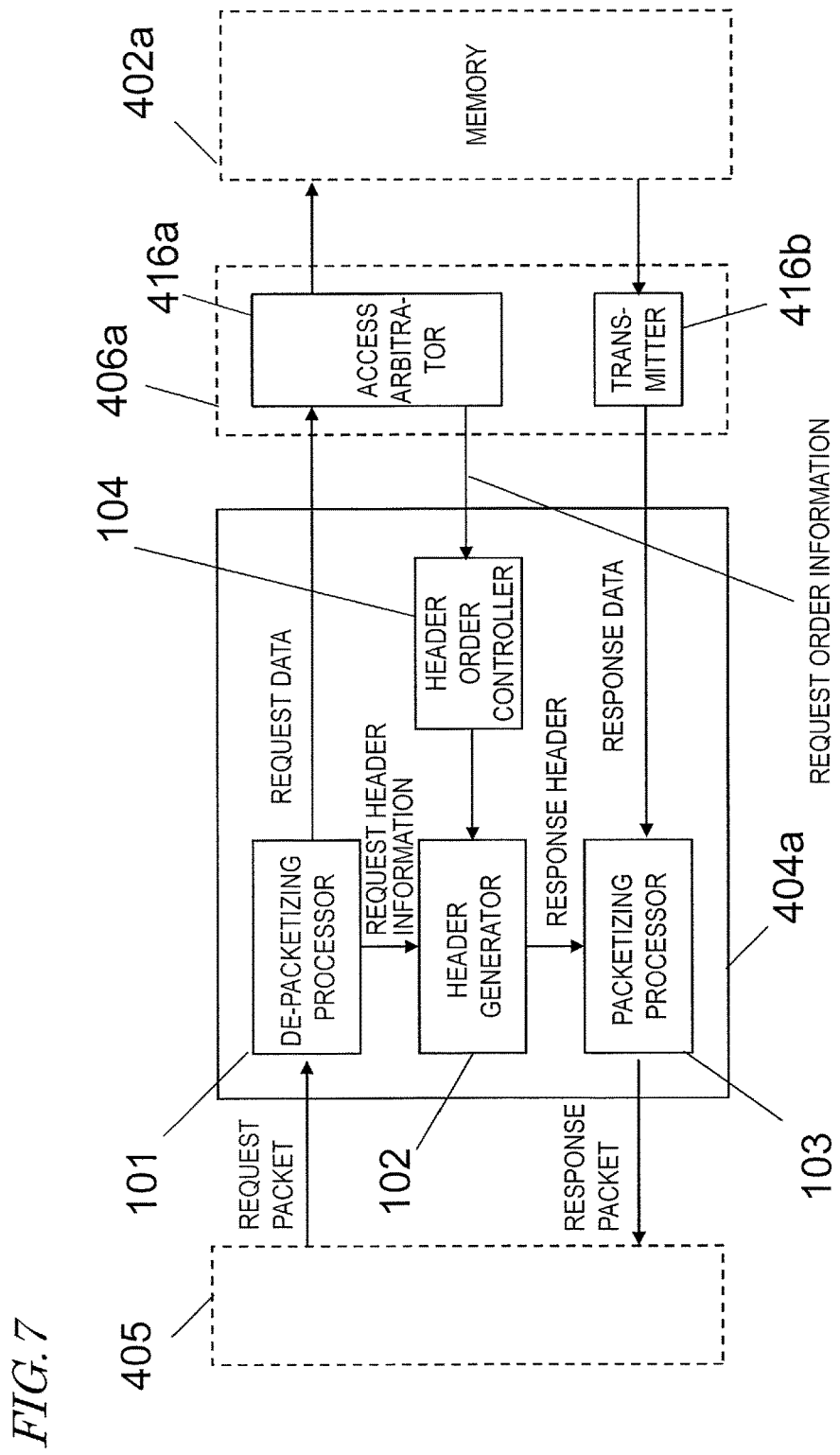

FIG. 7 illustrates an exemplary configuration for the NIC 404a on the memory end shown in FIG. 3.

FIG. 8 shows various types of signals to be supplied to a memory controller 406a.

FIG. 9 shows the rule applied by a header generator 102 in generating a header for a response packet.

Figure 10:
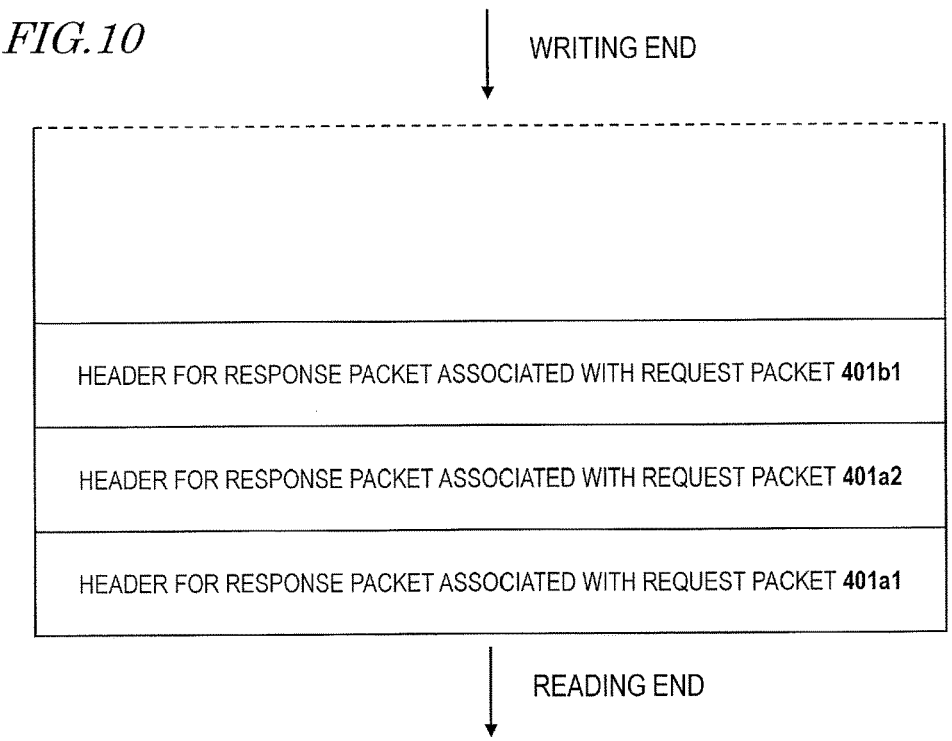

FIG. 10 shows an exemplary order list to be stored by the header generator 102 at the time T3 in the timing diagram shown in FIG. 6.

Figure 11:
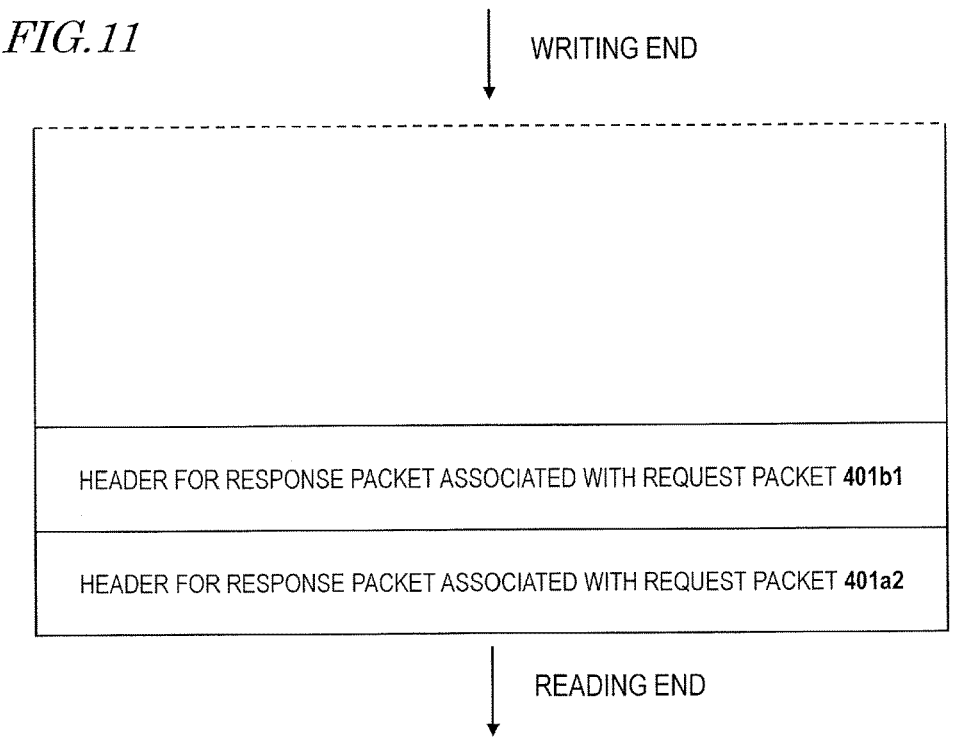

FIG. 11 shows the order list of response headers that has been updated after a response packet has been transmitted in response to a request packet 401a1.

Portions (A) to (D) of FIG. 12 show how the memory 402a operates if an access to the memory 402a is attempted in response to requests submitted by the initiators 401a and 401b shown in FIG. 3.

FIG. 13 shows an exemplary management structure for the request packets received by the memory controller 406a at the time T2 shown in FIG. 12.

FIG. 14 shows an exemplary piece of request order information.

Figure 15A:
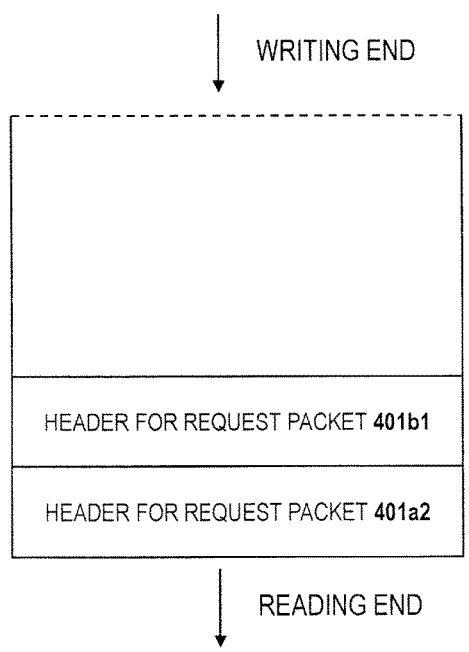
Figure 15B:
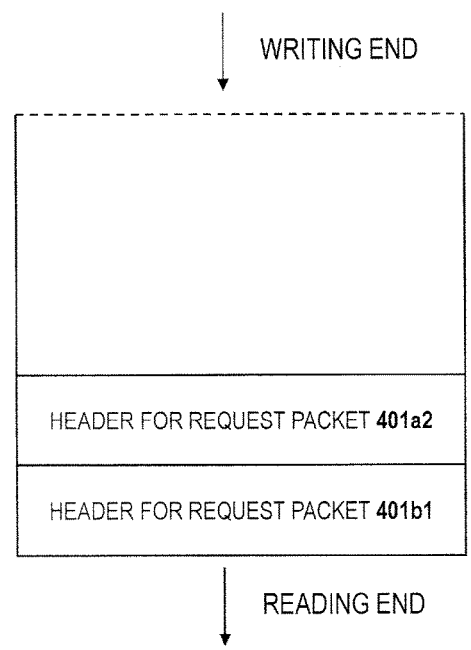

FIGS. 15A and 15B show how a header for a packet 401a2 and a header for a packet 401b1 may be stored.

Figure 16:
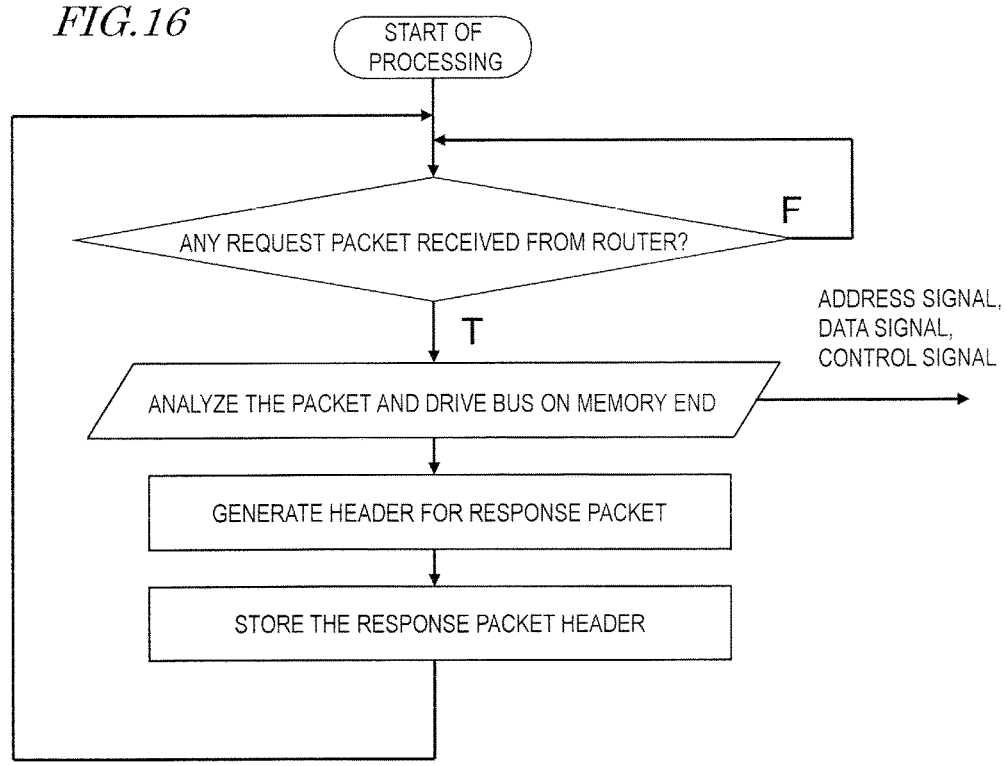

FIG. 16 shows the flow of the processing to be carried out by the NIC 404a when receiving a request packet.

Figure 17:
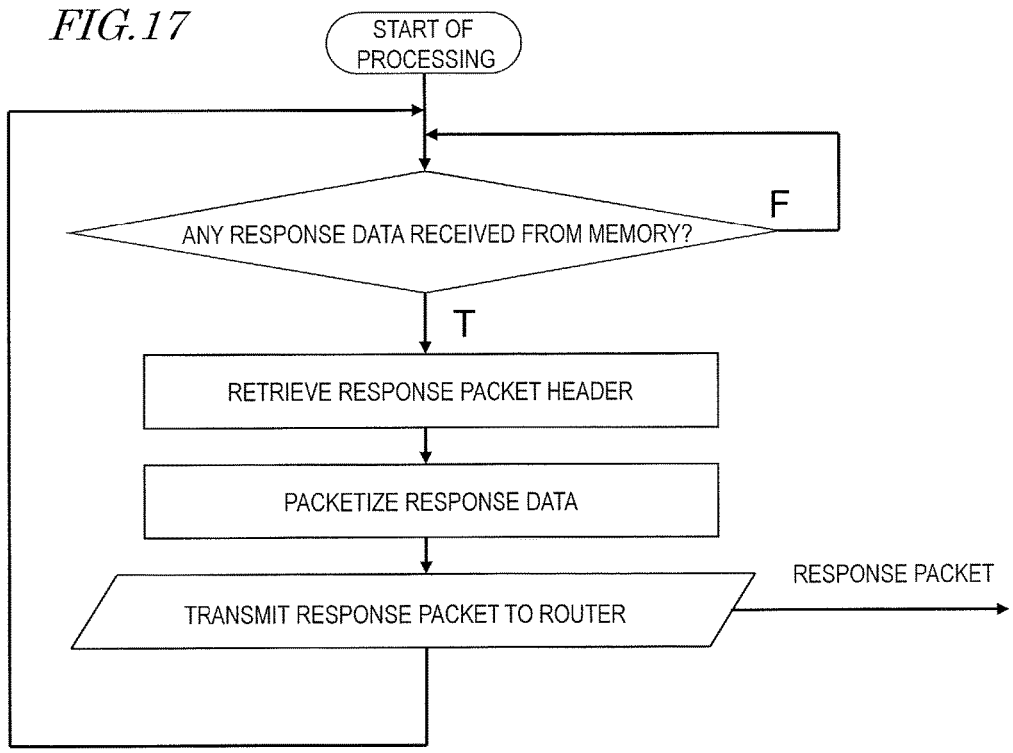

FIG. 17 shows the flow of the processing to be carried out by the NIC 404a when receiving response data.

Figure 18:
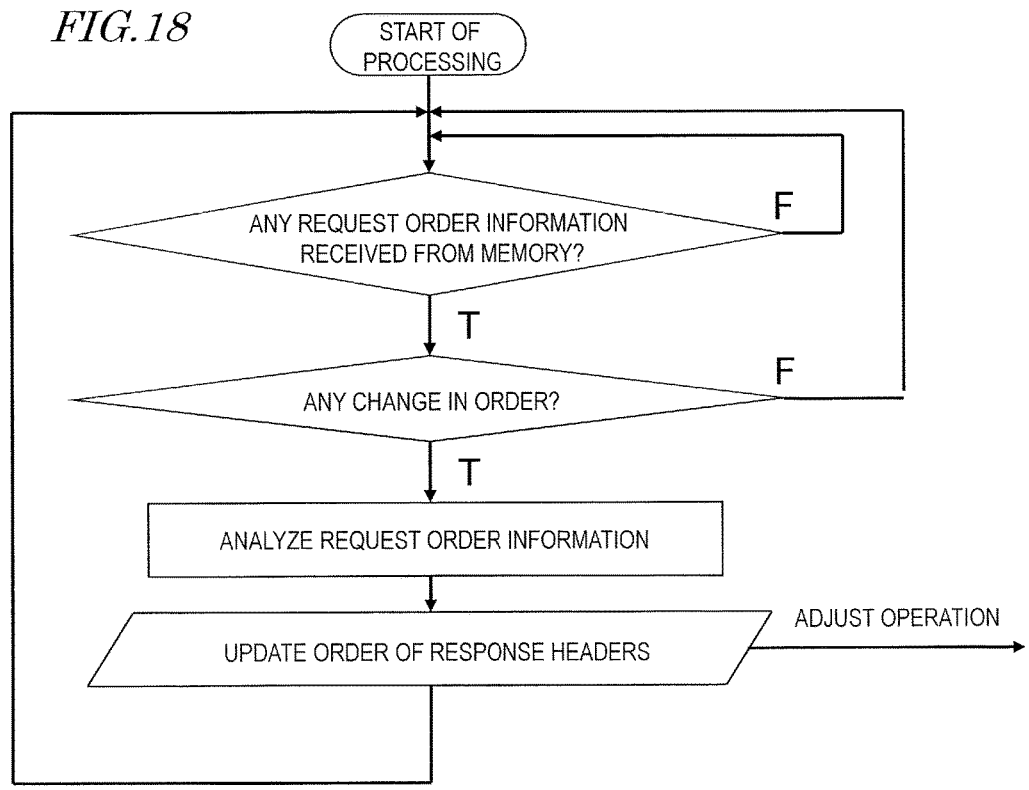

FIG. 18 is a flowchart showing the flow of the processing to be carried out by the NIC 404a in order to change the order of memory accesses.

FIG. 19 shows the data structure of a response packet header storage area in the header generator 102.

Figure 20A:
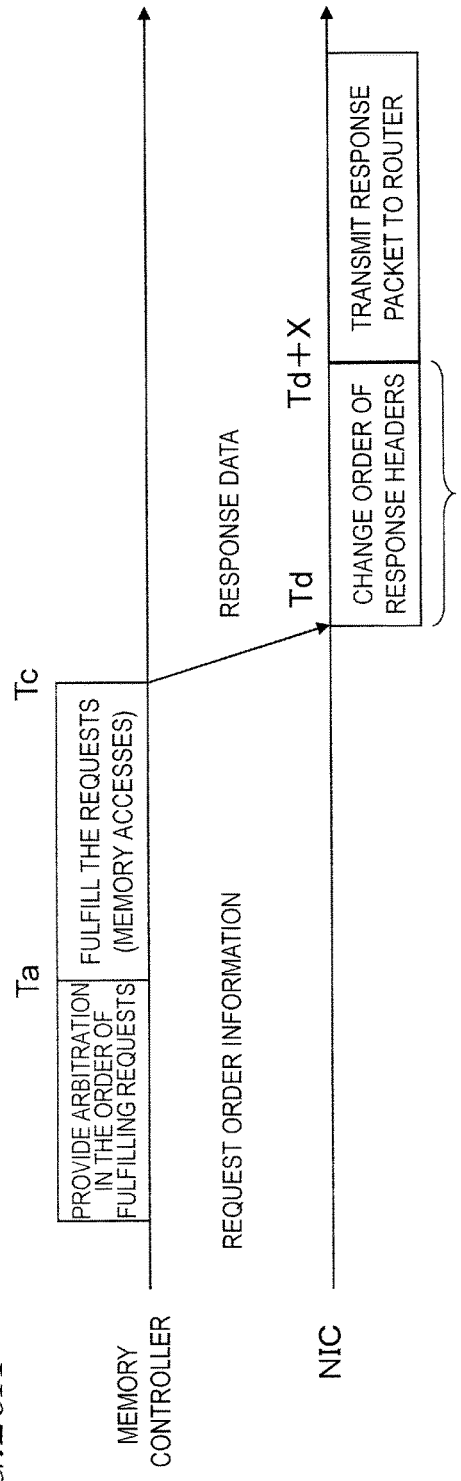
Figure 20B:
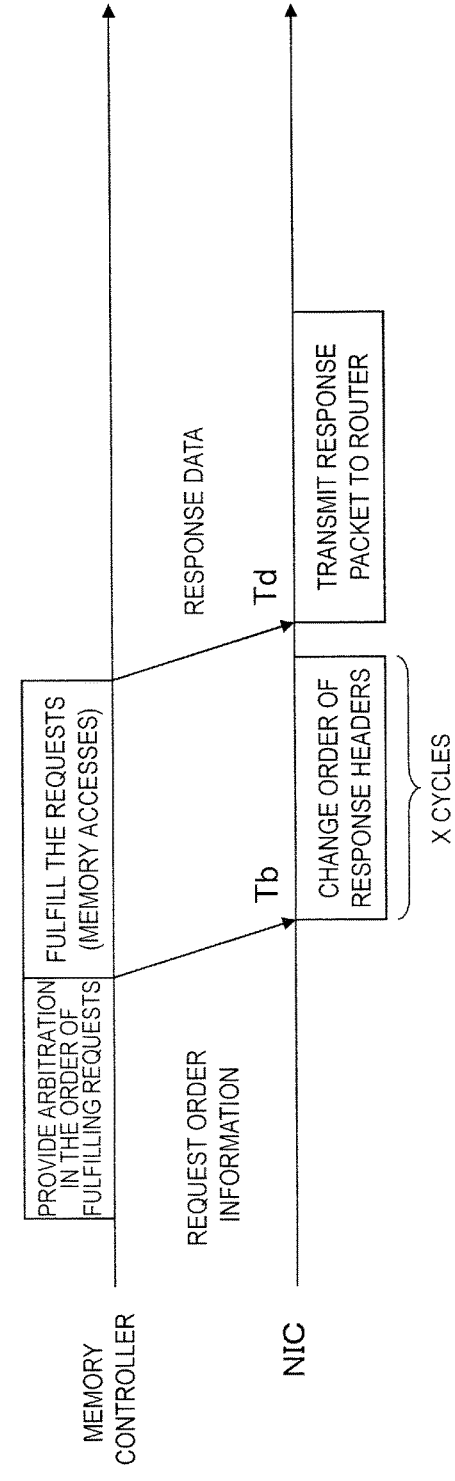

FIG. 20A shows the timings of operation for the memory controller 406a and the NIC 404a in a situation where a notice of request order information is received after a memory access operation has been finished, and FIG. 20B shows the timings of operation for the memory controller 406a and the NIC 404a in a situation where a notice of request order information is received before a memory access operation is started.

Figure 21:
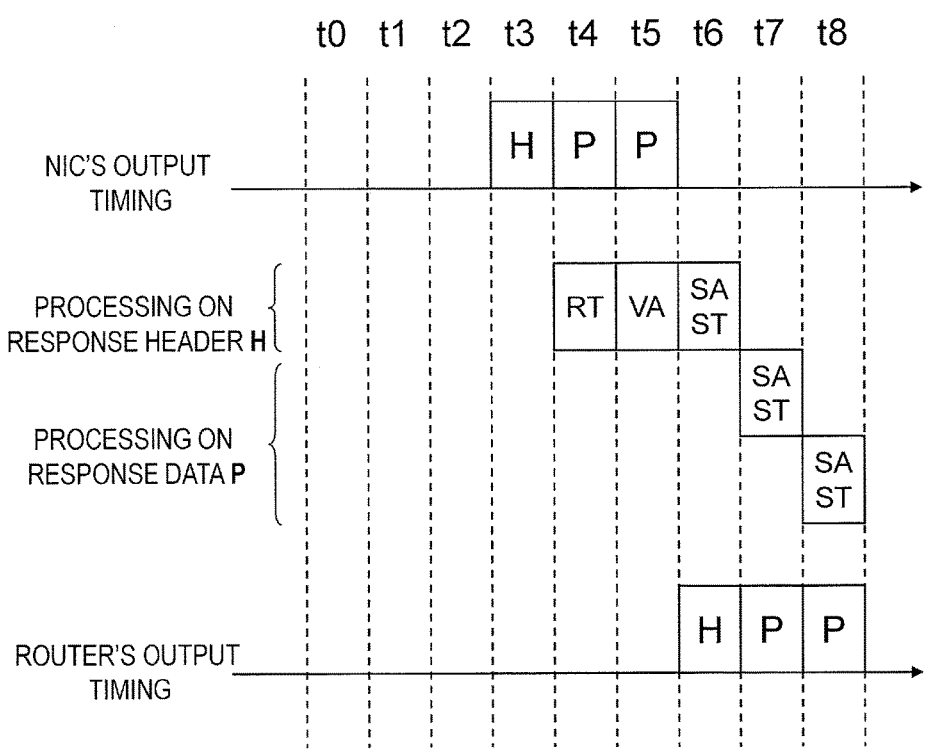

FIG. 21 shows the output timings of an NIC, the output timings of a router 405 which is connected to the NIC, and how processing is performed inside the router 405.

Figure 22:
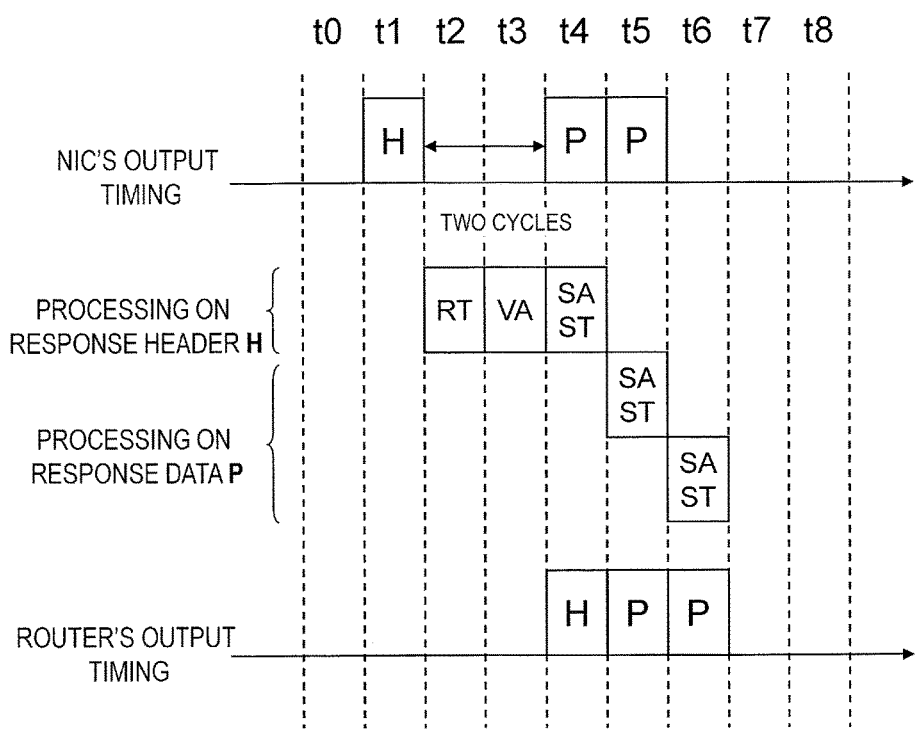

FIG. 22 illustrates processing to be carried out in a situation where a header for a response packet and response data have been transmitted or received separately from each other.

Figure 23:
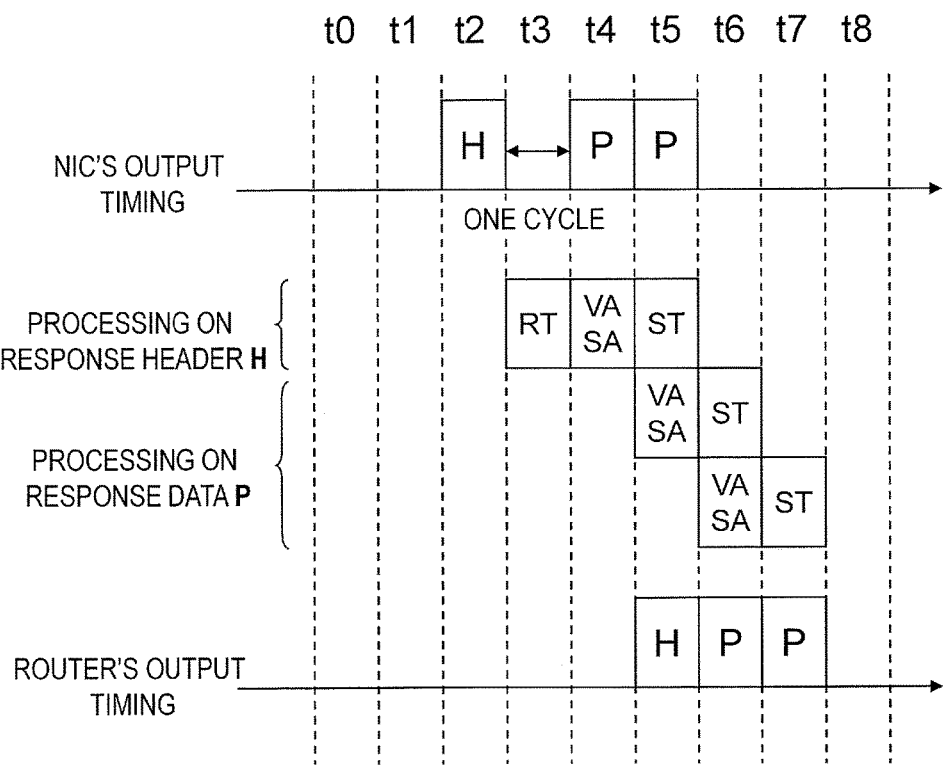

FIG. 23 shows the best timing of outputting a response header for a three-cycle router, of which the pipeline processing consists of the three stages of routing processing, virtual channel allocation and output switch allocation, and switching.

Figure 24:
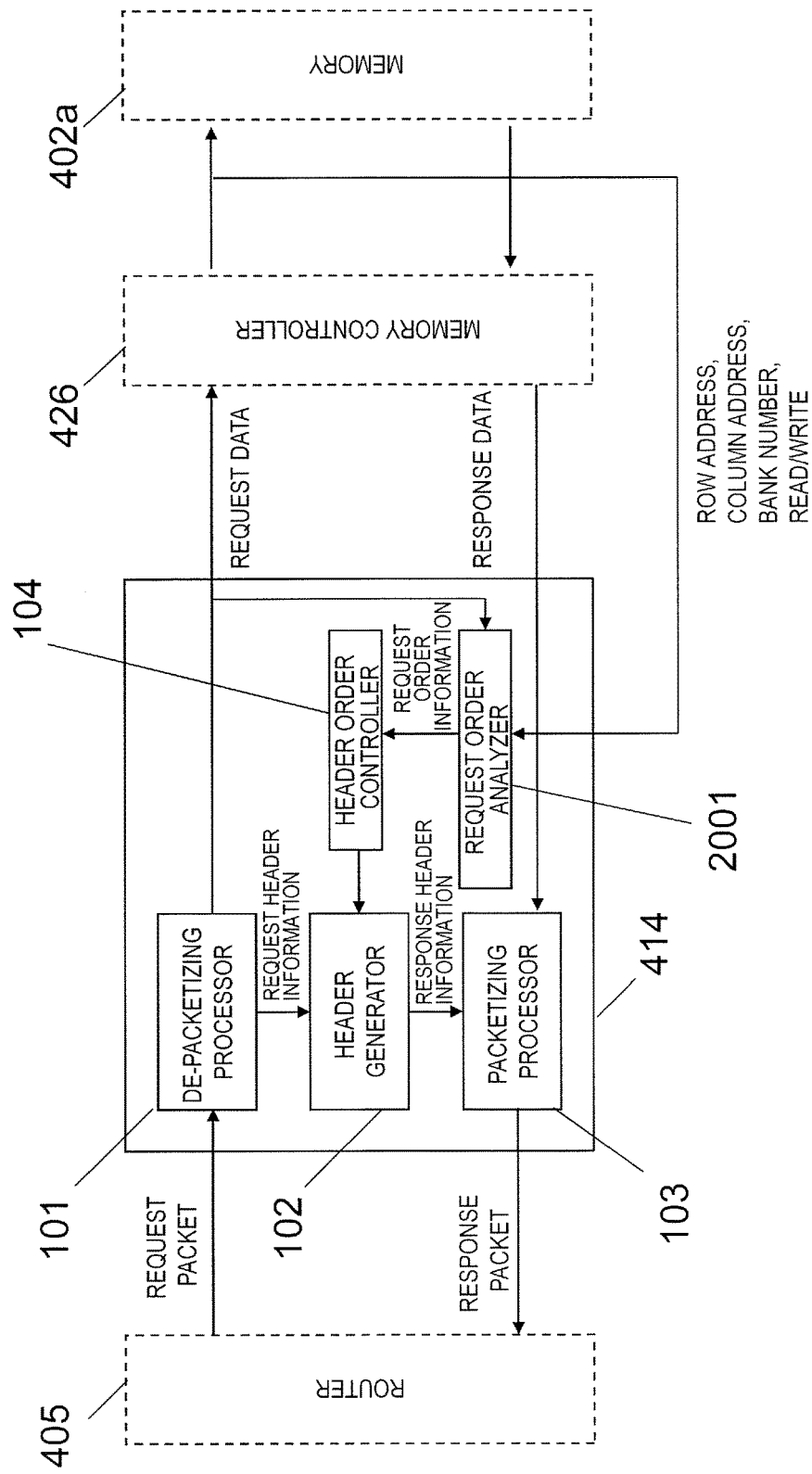

FIG. 24 illustrates an exemplary configuration for an NIC 414 according to a second embodiment.

FIG. 25 illustrates an exemplary data structure for storing the order of requests.

FIG. 26 shows an exemplary data structure for use to perform inverse conversion on the addresses.

FIG. 27 shows the state of the storage area.

DETAILED DESCRIPTION

The present inventors studied problems with the conventional configuration mentioned above. In order to interconnect initiators and targets to be interfaced by on-chip bus protocol such as AXI, OCP or AHB to an NoC that is a packet exchange network, an interface apparatus to perform packetizing and de-packetizing is needed. Such an interface apparatus is generally called an "NIC (network interface controller)".

Figure 1:
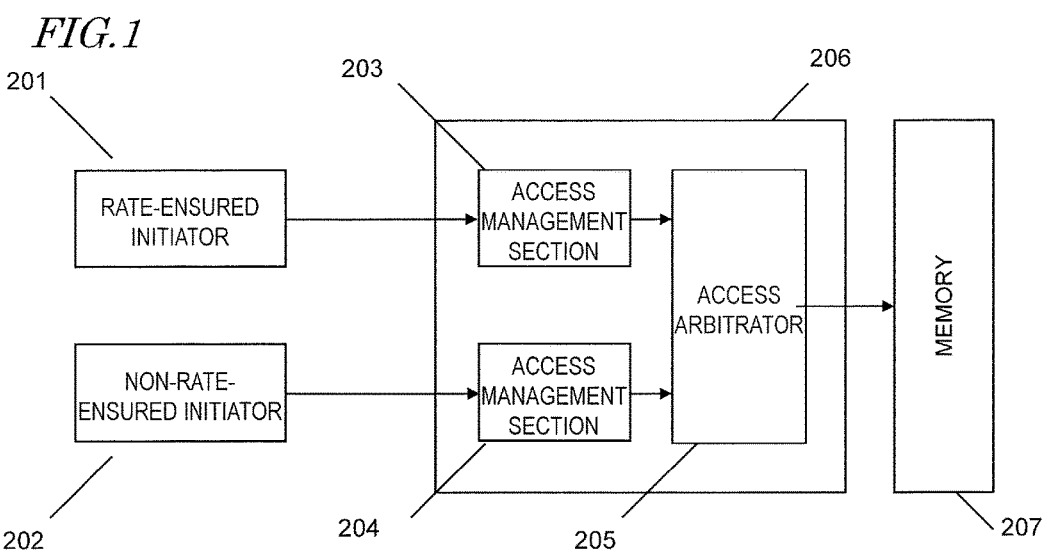
FIG. 1 illustrates a configuration for a conventional SoC.
Figure 2:
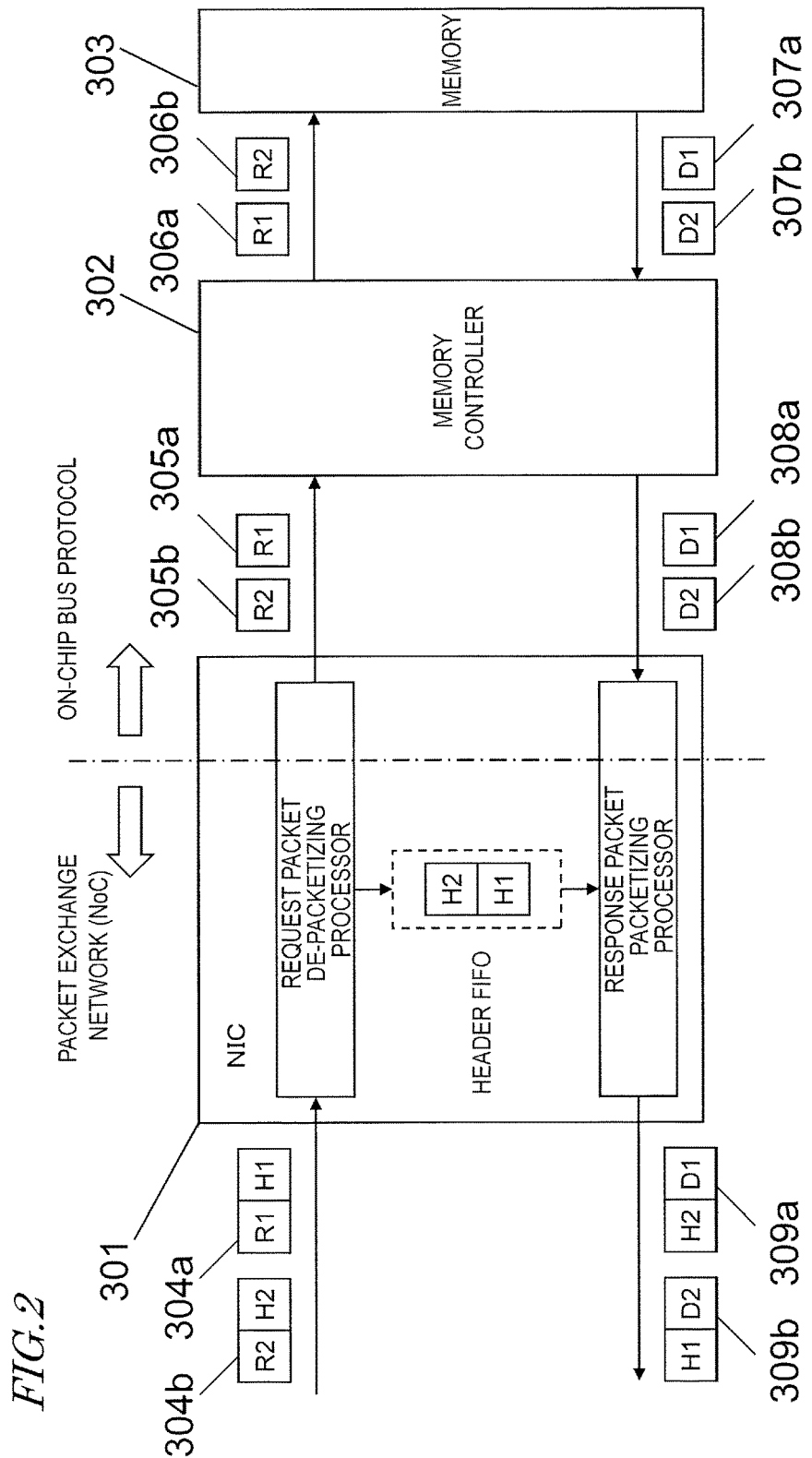
FIG. 2 illustrates what internal configuration a network interface 301 may have and how the network interface 301, a memory controller 302 and a memory 303 may be connected together.

FIG. 2 illustrates what internal configuration a network interface 301 may have and how the network interface 301, a memory controller 302 and a memory 303 may be connected together. The memory controller 302 is connected to an NoC, which is a packet exchange network, via the network interface 301. The memory controller 302 is also connected to the memory 303.

On the NoC, every data is transmitted and received on a packet basis, and response data from the memory such as read data and write response (which will be also referred to herein as "response information") is packetized by the NIC 301 and then sent out onto the NoC. Meanwhile, request data to the memory such as write data and read command (which will be also referred to herein as "request information") is received in the form of packets by the NIC 301. The packets are de-packetized and then transmitted to the memory controller 302.

Packets 304a and 304b are request packets which request reading or writing from/to the memory. The packet 304a is made up of a packet header H1 and request data R1. Likewise, the packet 304b is also made up of a packet header H2 and request data R2. These packets 304a and 304b have arrived at the NIC 301 in this order. In the packet header, stored is information which an NoC router needs in relaying the packet and which includes the IDs of source and destination NICs and the priority level of the packet, for example.

The NIC 301 de-packetizes the request packet 304a, extracts the request data R1 from it, converts the data R1 in accordance with a predetermined on-chip bus protocol, and then transmits the converted request data R1 to the memory controller 302. Subsequently, the NIC 301 also extracts the request data R2, converts the data R2 in accordance with the predetermined protocol, and then transmits the converted data R2 to the memory controller 302. Depending on the result of a rate control performed by the memory controller 302 on requests that have been transmitted from a plurality of initiators, requests to be carried out with respect to the memory 303 may be transmitted in reverse order, i.e., in the order of the request data 306b and 306a. In that case, the memory 303 retrieves the data in the order of arrival of the request data. As a result, data (D2) 307b is read first in response to the request data 306b, and then data (D1) 307a is read in response to the request data 306a. Consequently, response data 308b and 308a arrive in this order at the NIC 301. That is to say, in that case, the order of transmission of the request data is the reverse of the order of reception of the response data.

The NIC 301 packetizes the response data, completes response packets 309b and 309a in this order, and then transmits those response packets to a nearby router (not shown). In generating these response packets 309b and 309a, packet headers H1 and H2 need to be added to the response data 308b and 308a, respectively. The NIC 301 stores the packet headers H1 and H2 that were added to the request packets, along with the order in which the request data was submitted with respect to the memory. Thus, the NIC 301 adds the stored packet headers H1 and H2 in this order to the response data 308b and 308a which have been received from the memory 303 via the memory controller 302. As a result, the NIC 301 can complete the response packets and transmit them to the nearby router (not shown). In FIG. 2, shown are the response packets 309b and 309a which were generated, and have been transmitted, by the NIC 301.

It should be noted that in these response packets 309a and 309b, the proper relation between the header and the payload is no longer maintained but lost. One response packet should be comprised of the header H1 which is now included in the response packet 309b and the response data D1 which is now included in the response packet 309a. Likewise, the other response packet should be comprised of the header H2 which is now included in the response packet 309a and the response data D2 which is now included in the response packet 309b.

Such an inconvenience has been caused because the change of the order of requests that was made inside the memory controller 302 reversed the correspondence between the order of the response headers stored in the NIC 301 and the order of the response data arrived from the memory. Unless a response header were added properly to its associated response data, the packet relaying processing to be carried out by the NoC router by reading information in the header would break down. In that case, not only the performance would decline but also even a system failure could be caused as the case may be. This problem would arise no matter whether the request submitted is a memory read request or a memory write request.

In order to overcome these problems, the present inventors perfected our invention.

An aspect of the present invention can be outlined as follows:

An interface apparatus according to an aspect of the present invention connects together a memory controller that is connected to a memory on an integrated circuit and a bus network that has been formed on the integrated circuit. The memory controller includes: an arbitrator which provides arbitration in the order of processing of a plurality of request data; and a transmitter which transmits respective response data that have been output from the memory in response to those request data to the interface apparatus. The interface apparatus includes: a de-packetizing processor which performs de-packetize processing on each of the request packets that have been received from the bus network and which extracts and outputs a request header and request data from each of the request packets; a header generator which receives, in a first order, the plurality of request headers that the de-packetizing processor has output, sequentially generates response headers associated with the request headers, and then stores the response headers so that the response headers are read in the first order; a packetizing processor which generates response packets based on the response data that has been output from the memory in response to the request data and the response headers that are stored in the header generator and which transmits the response packets to the bus network; and a header order controller which controls the header generator so that if the arbitrator has transmitted the plurality of request data to the memory in a second order which is different from the first order, the respective response headers are read in the second order.

In one embodiment, the header order controller gets request order information, indicating that the plurality of request data have been transmitted in the second order, from the arbitrator.

In another embodiment, the arbitrator outputs request order information indicating that the plurality of request data have been transmitted in the second order. The header generator has a storage area in which the order of reading is determined by storage locations. And the header order controller changes the storage locations of the respective response headers in the header generator in accordance with the request order information.

In another embodiment, the arbitrator outputs request order information indicating that the plurality of request data have been transmitted in the second order. The header generator stores the respective response headers and their order of reading in association with each other. The header order controller changes the order of reading which is stored in the second storage area in accordance with the request order information.

In another embodiment, the header order controller gets the request order information before the packetizing processor gets the response data in response to the request data for which the arbitration has been provided, and controls the header generator so that the response headers are read in the second order.

In another embodiment, the interface apparatus is able to transmit the response packets to a router which is connected to the bus network. Before the packetizing processor gets the response data in response to the request data for which the arbitration has been provided, the header order controller controls the header generator so that the response headers are read in the second order. The packetizing processor stores in advance router information which is either information about the amount of delay of processing to be carried out by the router on the response headers and the response data or information about the procedure of pipeline processing by the router. And the packetizing processor transmits first the response headers to the router, and then transmits the response data at a time interval which is determined by reference to the router information.

An interface apparatus according to another aspect of the present invention connects together a memory controller that is connected to a memory on an integrated circuit and a bus network that has been formed on the integrated circuit. The interface apparatus includes: a de-packetizing processor which performs de-packetize processing on each of the request packets that have been received from the bus network and which extracts and outputs a request header and request data from each of the request packets; a header generator which receives, in a first order, the plurality of request headers that the de-packetizing processor has output, sequentially generates response headers associated with the request headers, and then stores the response headers so that the response headers are read in the first order; an analyzer which monitors the state of a signal that is sent from the memory controller to the memory to see if the plurality of request data have been transmitted in a second order which is different from the first order; a packetizing processor which generates response packets based on the response data that has been output from the memory in response to the request data and the response headers that are stored in the header generator and which transmits the response packets to the bus network; and a header order controller which controls the header generator so that if the analyzer has sensed, as a result of an analysis, that the plurality of request data have been transmitted to the memory in the second order that is different from the first order, the respective response headers are read in the second order.

In one embodiment, on sensing that the plurality of request data have been transmitted to the memory in the second order, the analyzer gets the request order information.

A memory bus system according to still another aspect of the present invention includes: a bus network which has been formed on an integrated circuit; a memory which is arranged on the integrated circuit; a memory controller which is also arranged on the integrated circuit and connected to the memory; and the interface apparatus according to any of the embodiments described above, which connects the memory controller and the bus network together.

In one embodiment, the memory bus system further includes an initiator which is connected to the bus network. The initiator transmits request data requesting an access to the memory and receives response data as a result of the access to the memory.

Hereinafter, embodiments of a transmission apparatus and method according to the present disclosure will be described with reference to the accompanying drawings.

Embodiment 1

FIG. 3 illustrates the structure of an SoC 400, which is a semiconductor integrated circuit (chip) including a bus network 450 that uses the packet exchange method (i.e., a distributed bus network). In this SoC 400, the network 450 established on the chip connects together a plurality of initiators 401a to 401e and a plurality of memories 402a and 402b. Memory controllers 406a and 406b are also provided for those memories 402a and 402b, respectively.

Examples of the initiators 401a to 401e include a processor, a DSP (digital signal processor), a GP (graphic processor) and an IO (input/output) device.

Each of the NICs and memory controllers shown in FIG. 3 may be either an electronic circuit which has been fabricated on the chip (i.e., the SoC 400) or a chip which is integrated into a predetermined chip set that forms at least part of the SoC 400. Each of those NICs can make communications using a particular physical layer and/or data link layer.

The memories 402a and 402b are storage devices to be accessed by each of those initiators 401a to 401e. Examples of the memories include a DRAM, an SRAM, and an EEPROM. An SoC to be formed by incorporating a plurality of functions into a single system may be a mix of an initiator which was developed originally in order to make the function of product quite different from the others, an initiator to be built in either by just introducing it as it is from another system or by customizing it, and a retailed general-purpose initiator. For that reason, the bus protocol to be interfaced is generally different from one initiator to another. The same can be said about memory controllers. That is why the SoC 400 may be mix of not just an original protocol but also any other arbitrary protocol such as AXI, AHB, APB, OCP or PIF. The respective initiators and memories are connected to the packet exchange network 450 comprised of routers via NICs 403a to 403e on the initiator end, NICs 404a and 404b on the memory end, and the memory controllers 406a and 406b. Each of those NICs carries out bus protocol conversion processing adaptively to the packet exchange network 450 and interfaces the memory access data to be transmitted and received between the initiators and the memories onto the NoC bus by packetizing and de-packetizing the data.

Also, if the requested bandwidth is variable, for example, as the initiators change, the memories also change depending on the intended application. That is to say, the entire SoC 400 but the initiators 401a to 401e, specifically, a system including the packet exchange network 450 including the NICs, the memory controllers 406a and 406b, and the memories 402a and 402b (i.e., a memory bus system), may be provided in advance and initiators may be connected as needed depending on the intended application. In this manner, a module can be provided for the SoC 400 and a highly universal operating environment can be provided.

FIGS. 4A to 4D illustrate various types of packets to be transmitted and received over the NoC and their exemplary formats.

Figure 4A:
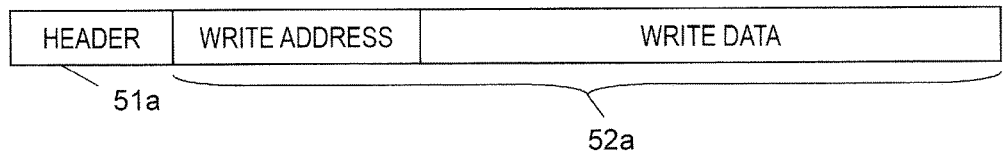
FIGS. 4A, 4B, 4C and 4D illustrate various types of packets to be transmitted and received over an NoC and their exemplary formats.
Figure 4B:
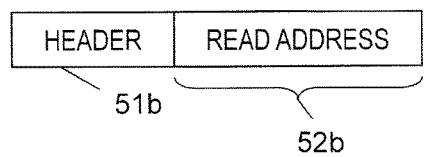

FIGS. 4A and 4B illustrate exemplary formats for a write request packet and a read request packet, respectively. The write request packet shown in FIG. 4A includes a header 51a and request data 52a. The read request packet shown in FIG. 4B includes a header 51b and request data (read address) 52b. Optionally, a request packet may include a header and a part of an address. For example, the header 51a shown in FIG. 4A and the write address included in the request data 52a may be combined into a single header. In other words, the write address may be included in one of the headers 51a and 51b shown in FIGS. 4A and 4B.

Figure 4C:
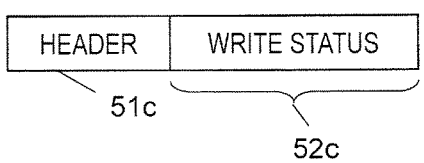
Figure 4D:
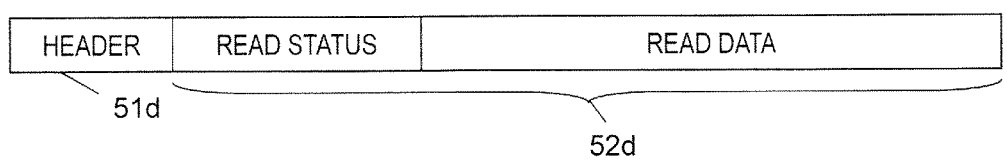

FIGS. 4C and 4D illustrate exemplary formats for a write response packet and a read response packet, respectively. A response packet stores data representing the result of an operation that has been performed in response to a request packet. The write response packet includes a header 51c and response data (write status) 52c. The read response packet includes a header 51d and request data 52d. Optionally, a read address or a write address may be included in the read status or write status of a response packet. If an address is included, then an address field will also be stored as a part of a response header in the storage area shown in FIGS. 15A and 15B as will be described later.

Figure 5:
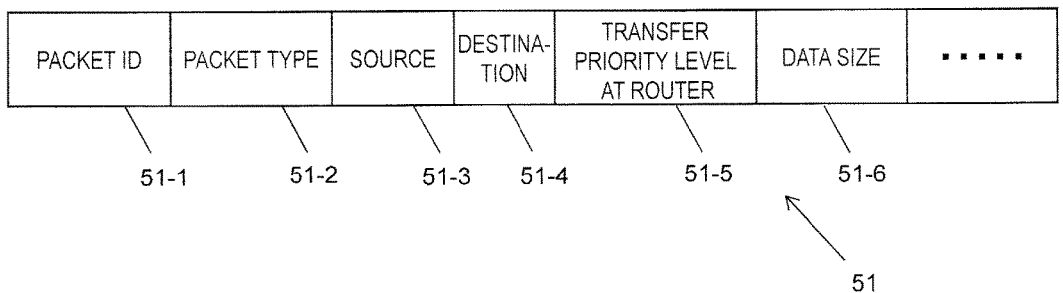
FIG. 5 illustrates an exemplary format for a packet header 51.

FIG. 5 illustrates an exemplary format for the packet header 51, which may include a packet ID field 51-1, a packet type field 51-2, a source field 51-3, a destination field 51-4, a transfer priority level field 51-5, and a data size field 51-6, for example.

The packet ID field 51-1 is a unique identifier given to each initiator to allow the NIC to check out correspondence between a request packet transmitted and its corresponding response packet. The packet type field 51-2 is a piece of information indicating the type of the given packet which may be a read request packet, a read response packet, a write request packet or a write response packet. The source field 51-3 and the destination field 51-4 are the IDs of initiators or memories which are unique destinations for a system and which will be used by an NoC router to determine a packet transfer route. The transfer priority level field 51-5 is priority level information for use to ensure quality by giving a top priority to an initiator's access request that needs to have higher access quality than any other initiator's, for example. The data size field 51-6 is a piece of information about the size of the data to read or write. Any other piece of information may be included in the header as well.

In an SoC of a large scale which is supposed to be built in an audiovisual appliance or a mobile telecommunications device, generally a number of initiators with various characteristics will be connected together. For example, an initiator which is designed to get signal processing done in real time is called a "rate-ensured initiator" which needs to guarantee an access at a constant rate within a predetermined period of time. Meanwhile, an initiator which is designed to access the Web is called a "non-rate-ensured initiator" which submits memory access requests at intervals and frequency that are irregular and difficult to predict.

Suppose the initiators 401a and 401b shown in FIG. 3 are a rate-ensured initiator and a non-rate-ensured initiator, respectively.

Portions (A) through (D) of FIG. 6 show the flow of data processing to be performed when the rate-ensured initiator 401a and non-rate-ensured initiator 401b shown in FIG. 3 are attempting to access the memory 402a.

Portion (A) of FIG. 6 shows the number of cycles it takes to ensure a predetermined rate for the rate-ensured initiator 401a. As shown in portion (A) of FIG. 6, to ensure a predetermined rate for the initiator 401a, the memory controller 406a needs to do a memory access once in every R cycles on average.

Portion (B) of FIG. 6 indicates the timing at which the memory access request packet that has been output from the initiator 401a arrives at the NIC 404a (see FIG. 3) which is connected to the memory controller 406a. On receiving the request packet 401a1, the NIC 404a de-packetizes the request packet, generates a header to be added to a response packet based on the request packet's header and stores it, and transmits request data to the memory controller 406a. In this manner, a memory access is started. Portion (B) of FIG. 6 also shows that the next request packet 401a2 transmitted by the initiator 401a has already arrived at the NIC 404a.

Portion (C) of FIG. 6 indicates that memory access processing that has been carried out in response to the request packet 401a1 that was received at a time T0 (see portion (A) of FIG. 6) has ended at a time T3. Thus, at this time T3, the memory controller 406a is ready to start the next memory access. The next request packet 401a2 shown in portion (B) of FIG. 6 has already arrived at the NIC 404a before the time T3. The NIC 404a de-packetizes the request packet 401a2, generates a header to be added to a response packet based on the request packet's header and stores it, and transmits request data to the memory controller 406a.

Portion (D) of FIG. 6 indicates that at a time T2 which is earlier than the time T3, a request packet 401b1 transmitted by the initiator 401b has already arrived at the NIC 404a. In response, the NIC 404a de-packetizes the request packet 401b1, generates a header to be added to a response packet based on the request packet's header and stores it, and transmits request data to the memory controller 406a.

As described above, at the time T3, the memory controller 406a is ready to start the next memory access. However, the memory controller 406a has already received request data that has been extracted from the two request packets 401a2 and 401b1. Thus, the memory controller 406a decides which request data should be processed next (i.e., performs arbitration processing).

As long as the next memory access request submitted by the initiator 401a is fulfilled with a period of time T0+R, a predetermined rate can be ensured for the initiator 401a. That is to say, even if the request data processing for the initiator 401a is not carried out preferentially, there is still plenty of time left. That is why at the time T3, the memory controller 406a chooses the request data that has been extracted from the request packet 401b1 that has come from the initiator 401b as the data to process next. The order in which the NIC 404a has transmitted request data to the memory controller 406a agrees with the order in which the request packets 401a1, 401a2 and 401b1 have been transmitted.

However, as a result of the arbitration that has been provided by the memory controller 406a, the order to carry out accesses is changed as already described with reference to FIG. 2. Specifically, the request packets 401a1, 401b1 and 401a2 are processed in this order. Thus, the memory controller 406a notifies the NIC 404a that the order to carry out accesses has been changed between the request data extracted from the request packet 401a2 and the request data extracted from the request packet 401b1.

In response to this notification, the NIC 404a adjusts the order to output the response headers stored. The response data is transmitted from the memory 402a to the NIC 404a via the memory controller 406a in the order of the request packets 401a1, 401b1 and 401a2. The NIC 404a retrieves response headers in the correct order with respect to the respective response data, thereby completing the respective response packets. The response packets thus generated are transmitted to an NoC router which is connected to the NIC 404a and then forwarded to the initiators through an NoC bus.

FIG. 7 illustrates an exemplary configuration for the NIC 404a on the memory end shown in FIG. 3. FIG. 7 also shows how a router 405, the memory controller 406a and the memory 402a may be connected together. It should be noted that the NIC 404a corresponds to the NIC 404a shown in FIG. 3 but that the NIC 404b also has the same configuration as the NIC 404a. Thus, in the following description of this embodiment, it will be described, just as an example, how the NIC 404a operates with respect to the memory controller 406a.

The NIC 404a includes a de-packetizing processor 101, a header generator (a header generating and storing section) 102, a packetizing processor 103 and a header order controller 104.

(De-Packetizing Processor 101)

The de-packetizing processor 101 receives a request packet via the router 405. The request packet includes a memory access request that has been transmitted by the initiator. The format of the request packet may be as shown in FIG. 4A or FIG. 4B, for example. In writing data on a memory, for example, the de-packetizing processor 101 separates a header from the request packet received.

FIG. 8 shows various types of signals to be supplied to the memory controller 406a. The de-packetizing processor 101 presents write data to the data bus signal line of the memory controller and also presents an address to the address bus signal line thereof. Also, the de-packetizing processor 101 analyzes the contents of the header, extracts necessary information, and presents it to the control signal line. For example, in the exemplary configuration for the header 51 shown in FIG. 5, the de-packetizing processor 101 extracts the size of write data from the data size field 51-6, calculates the number of cycles it takes to make a burst transfer, and presents it as a control signal. Furthermore, the de-packetizing processor 101 transmits the header 51a of the request packet separated to the header generator 102.

(Header Generator 102)

The header generator (header generating and storing section) 102 shown in FIG. 7 generates a new header 51 based on the headers 51a and 51b of the request packets provided by the de-packetizing processor 101 and stores it. The new header 51 is used to be added to a response packet that responds to a memory operation to be performed at that request.

FIG. 9 shows the rule applied by the header generator 102 in generating the header of a response packet. Since the packet ID field is a piece of information to be relied on to pair request data with response data, the packet ID of a request packet is copied onto the header 51c of the response packet (i.e., the response header 51c) or the response header 51d. The packet type field is transformed into a value representing read response if the given request packet is a read request packet or a value representing write response if the given request packet is a write request packet, and then stored in the response header 51c or 51d.

In the source field of a request packet, stored is the ID of the NIC on the initiator end which has submitted the memory access request. In processing a response packet, on the other hand, that initiator becomes a destination in turn. Thus, the header generator 102 copies the information stored in the source field of the request packet's header (i.e., the request header) onto the destination field of the response header. Meanwhile, although the ID of the NIC on the memory end is stored in the destination field of a request header as for a request packet, that memory becomes the source in turn if the packet of interest is a response packet. That is why the header generator 102 copies the information stored in the destination field of the request header onto the source field of the response header. Similar transformation processing is carried out as needed for the other fields, thereby generating a response header.

The header generator 102 stores the respective headers of the response packets thus generated in the order in which the NIC has received the request packets. The headers may be stored using a list structure with an order.

FIG. 10 shows an exemplary order list to be stored by the header generator 102 at the time T3 in the timing diagram shown in FIG. 6. At the time T2, a memory access operation in response to the request packet 401a1 is still being performed. The result of the access to the memory 402a that has been attempted in response to the request packet 401a1 is received as response data from the memory 402a. The NIC 404a is ready to add the header of a response packet that has been received in response to the access request submitted as the request packet 401a1 to the next response data that the NIC 404a has received from the memory controller 406a.

(Packetizing Processor 103)

Now take a look at FIG. 7 again.

The packetizing processor 103 performs processing of adding a header to the response data that has been received from the memory end and other kinds of processing to complete a response packet and transmits it to the router 405 on the NoC bus end. The header to be added to the response data is gotten from the header generator 102.

At the time T3, a memory access operation in response to the request packet 401a1 is finished and response data is sent in response, when the packetizing processor 103 retrieves the response header from the header generator 102. As described above, at the time T3, the response headers are stored as (the order list) shown in FIG. 10. The packetizing processor 103 gets a header for a response packet corresponding to the request packet 401a1 to complete a response packet, and sends it out to the router 405. After having transmitted the response packet in response to the request packet 401a1, the packetizing processor 103 updates the order list indicating the order in which the response headers are stored. FIG. 11 shows the order list of the response headers that has been updated after a response packet has been transmitted in response to the request packet 401a1.

(Header Order Controller 104)

The header order controller 104 shown in FIG. 7 controls the order of reading the response packets' headers which are stored in the header generator 102 in accordance with the order in which memory access operations have been performed by the memory controller 406a and the memory 402a.

Portions (A) to (D) of FIG. 12 show how the memory 402a operates if an access to the memory 402a is attempted in response to requests submitted by the initiators 401a and 401b shown in FIG. 3. In particular, portion (C) of FIG. 12 shows the request packets 401b1 and 401a2 transmitted after the time T3.

Portion (C) of FIG. 12 indicates that the memory 402a starts the processing responsive to the memory access request packet 401b1 submitted by the initiator 401b at the time T3 and finishes the memory access at the time T5. Portion (C) of FIG. 12 also indicates that the memory 402a immediately starts processing responsive to the memory access request packet 401a2 submitted by the initiator 401a1 and finishes the memory access at the time T6.

As shown in FIG. 7, the memory controller 406a includes an access arbitrator 416a and a transmitter 416b.

The access arbitrator 416a performs arbitration processing on a plurality of request data. As a result of the arbitration processing, the order of fulfilling the requests in response the memory access request packets 401a2 and 401b1 is changed. At this time, the access arbitrator 416a outputs request order information indicating how the order of fulfillment has been changed. The header order controller 104 gets the request order information from the access arbitrator 416a.

For example, the access arbitrator 416a of the memory controller 406a may store the order in which request data has been received from the NIC 404a, and may provide request order information, indicating how the order of fulfillment of request data has been adjusted through the arbitration processing with respect to the order of reception of the request data, for the header order controller 104 of the NIC 404.

The transmitter 416b transfers the data that has been output from the memory in response the request data to the packetizing processor 103 of the NIC 404a.

FIG. 13 shows an exemplary management structure for the request packets received by the memory controller 406a at the time T2. In this management structure, stored is information about the order of acceptance of the request packets 401a2 and 401b1 that have already been received from the NIC 404a.

At the time T3, the memory access operation responsive to the request packet 401b1 starts to be carried out before the memory access operation responsive to the request packet 401a2, when the memory 402a provides request order information, indicating that the order of fulfillment of the requests has been changed, to the header order controller 104.

FIG. 14 shows an exemplary piece of request order information. On getting the request order information, the header order controller 104 refers to the request order information to change the order in which the response headers in the header generator 102 are output to the packetizing processor 103 at the time T3. Specific processing may be carried out in the following manner. In the example to be described below, the header generator 102 is supposed to have a storage area where the order of reading is determined according to the storage location.

First, the header associated with the packet 401a2 and the header associated with the header 401b1 have been stored in this order as shown in FIG. 15A. In this state, the header for the packet 401a2 stored at the top location is retrieved first, and then the header for the packet 401b1 stored at the next location is retrieved.

The header order controller 104 changes the request order information (order list) from the state shown in FIG. 15A into the state shown in FIG. 15B. This processing can get done by making the header order controller 104 retrieve the second one from the top of the response headers stored and change the order of storage so that the header becomes the first one. As a result, the header associated with the packet 401b1 stored at the top location is retrieved first, and then the header associated with the packet 401a2 stored at the next location is retrieved.

FIG. 16 shows the flow of the processing to be carried out by the NIC 404a when receiving a request packet. On receiving a request packet from the router, the de-packetizing processor 101 analyzes the packet, drives the bus, and transmits request data, including an address signal, a data signal, and necessary control signals, to the memory controller 406a. The header generator 102 generates a header for a response packet and stores the header.

FIG. 17 shows the flow of the processing to be carried out by the NIC 404a when receiving response data. On receiving response data from the memory 402a via the memory controller 406a, the packetizing processor 103 retrieves the header that is located at the top of the order list stored in the header generator 102, and adds the header to the response data to generate a response packet. After that, the packetizing processor 103 transmits the response packet thus generated to the router 405.

FIG. 18 shows the flow of the processing to be carried out by the NIC 404a in order to change the order of memory accesses. The packetizing processor 103 receives response data from the memory 402a via the memory controller 406a. The header order controller 104 determines whether or not the order of processing the request data has been changed. If the answer is YES, the header order controller 104 analyzes the request order information and adjusts the order of the headers for response packets. Specifically, the header order controller 104 changes the order of arrangement of the headers in the order list that is stored in the header generator 102 so that the header for a response packet associated with the request that has already been fulfilled is located at the top of the order list. The list thus updated will be stored continuously in the header generator 102.

It should be noted that the NIC is notified of the request order information when the memory controller 406a changes the order of processing the request data. The NIC may be notified either every time arbitration is provided by the memory controller 406a or only when the order of fulfilling the requests is changed. The former may include a situation where arbitration processing has been certainly carried out by the access arbitrator 416a of the memory controller 406a but the order of fulfillment has not been actually changed.

Also, if the order of fulfilling the requests has been changed, then the order of entry of response packet headers in the order list shown in FIG. 15A may be changed into the one shown in FIG. 15B. Alternatively, only the order information may be changed without using any order list structure. Hereinafter, a modified example in which the order information is changed will be described.

FIG. 19 shows the data structure of the response packet header storage area in the header generator 102. In FIG. 19, illustrated are not only the response header storage area but also a storage area to store the order of retrieving the respective response headers. As shown in FIG. 19, the respective response headers and information about the order of retrieving them are stored in association with each other. Optionally, these two storage areas do not have to be separated but may be combined, and the respective response headers and information about the order of retrieving them may be stored in the form of a table.

Portion (A) of FIG. 19 shows the state of the order storage area before the order of processing the response data is changed. On sensing, by reference to the request order information, that the order of fulfillment has been changed, the header order controller 104 changes the order information stored as shown in portion (B) of FIG. 19. However, the response packet header storage area itself is not changed. Since there is no need to change the response packet header storage area, the processing load involved with the change can be lightened. The packetizing processor 103 generates response packets using headers for which the quickest order of fulfillment has been set with the lightest processing load involved.

If it takes a long time for the header order controller 104 to get the processing of changing the order of response headers done, then the request order information may be received before the memory access operation responsive to the request is finished.

FIG. 20A shows the timings of operation for the memory controller 406a and the NIC 404a in a situation where a notice of request order information is received after a memory access operation has been finished. On the other hand, FIG. 20B shows the timings of operation for the memory controller 406a and the NIC 404a in a situation where a notice of request order information is received before a memory access operation is started.

In FIG. 20A, a response packet starts to be transmitted at a time Td+X. On the other hand, in the example illustrated in FIG. 20B, the response packet can start to be transmitted at the time Td, which is X cycles earlier than in the example illustrated in FIG. 20A. As soon as the access arbitrator 416a of the memory controller 406a determines the order of fulfilling the requests at a time Ta, the access arbitrator 416a fulfils those requests in the interval between the times Ta and Tc. That is to say, the access arbitrator 416a performs access processing of reading or writing data from/to the memory 402a.

Before the request gets done, the memory controller 406a notifies the NIC 404a of the request order information at the time Ta prior to the transmission of the response data. On receiving the request order information at the time Tb, the header order controller 104 of the NIC 404a starts the processing of changing the order of response headers at that time Tb. In this example, suppose it take a processing time of X cycles for the header order controller 104 to get the response header order change processing done. Optionally, this processing may be carried out in parallel with the fulfillment of the request to access the memory 402a by the memory controller 406a.

The response data that has been retrieved from the memory 402a by fulfilling the request is transmitted to the packetizing processor 103 of the NIC 404a at the time Td. On receiving the response data, the packetizing processor 103 retrieves either the response header that was located at the top of the header generator 102 or a response header indicating that its associated request should be fulfilled earlier than any other request, and generates a response packet. After that, the packetizing processor 103 generates a response packet based on the response header and the response data and outputs the response packet to the router 405.

The response packet starts to be transmitted to the router 405 at the time Td, when response data is gotten after the request has been fulfilled completely. Compared to a situation where not only the request order information but also the response data are transmitted simultaneously, the processing delay of X cycles that would have been involved in such a situation can be cut down.

If the NIC 404a can be notified in advance by the memory controller 406a of the timing of request fulfillment, then a response header and response data may be transmitted separately to the router 405, instead of the response packet. Or before transmitting the response packet (more specifically, response data) from the NIC 404a to the router 405, the response header alone may be transmitted to the router 405 earlier. By transmitting the response header to the router 405 earlier, the transmission delay of the response packet caused by the router's processing time can be cut down. Hereinafter, a specific example will be described.

In transferring a packet, a router generally performs its processing in the order of (1) routing (RT) processing, (2) virtual channel allocation (VA), and (3) output switch allocation (SA) and switching (ST). Supposing each of these three stages needs to be carried out in one cycle, it will take three cycles in total for the router to get the packet transfer processing done. The output switch allocation and switching are needed for both a response header and response data alike. On the other hand, the routing processing and the virtual channel allocation are needed for only a response header. In three cycles from the timing when a response header for a response packet was received, the router 405 can start outputting the header to the routers and NICs on the next stage.

FIG. 21 shows the output timings of an NIC, the output timings of a router 405 which is connected to the NIC, and how processing is performed inside the router 405. In the example illustrated in FIG. 21, the header is supposed to have a size which is small enough to be transferred in one cycle, the response data is supposed to have a size which is small enough to be transferred in two cycles, and the response packet as a whole is supposed to have a size which is large enough to be transferred in three cycles.

As shown in FIG. 21, first of all, a response header H is output from the NIC 404a at a time t3. In the SoC system 400 (see FIG. 3), if the response header H is output from the NIC 404a, it means that the response header H is injected into the router 405 at the time t3. Subsequently, at times t4 and t5, response data P for two cycles is injected. In this description, if anything is "injected", then it means herein that a signal representing the response header H is loaded into the router 405. At the timing when the NIC 404a outputs the signal onto a signal line which is connected to the router 405, the signal arrives at the router 405. Unless the signal has been loaded into the router 405, then it means that the signal has not been injected into the router 405 yet. As shown in FIG. 21, the NIC outputs a signal representing the response header H on a signal line at the time t3 and the router is loaded with that signal at the same time. As a result, at a time t4 in the next cycle, the router 405 can perform an RT stage using the signal loaded.

The router 405 processes the response header H for three cycles and then processes the response data P for two cycles. This is a processing delay caused by the router 405. Due to this processing delay, the response packet is output from the router 405 from a time t6 through a time t8. Supposing the time t3 when the response header H was output from the NIC to be a starting point, it follows that a transfer delay of three cycles has been caused. That is to say, at the time t6 that is three cycles after the timing when the router 405 received a response header for a response packet, the router 405 is ready to output the response packet to a router or NIC that follows itself.

Next, suppose a situation where the NIC has transmitted a response header and response data separately to the router as described above. In the example illustrated in FIGS. 22 and 27 to be described below, the response data is supposed to be output from the NIC and arrive at the router at the time t4 as in the example illustrated in FIG. 21. That is to say, the following example will be described under the same condition as the example that has been just described.

FIG. 22 illustrates processing to be carried out in a situation where a header for a response packet and response data have been transmitted or received separately from each other.

In this example, at a time t0, the NIC 404a outputs a notification indicating a time when response data is scheduled to be output (e.g., a time t4 in this example). This notification arrives at the router 405 at the same time t0. As a result, the router 405 can detect the scheduled arrival time of response data at the time t0 before receiving the response data.

Considering that the response data is scheduled to be injected into the router 405 at the time t4, the NIC 404a injects a response header for the response data into the router 405 at a time t1 which is three cycles before the time t4. On receiving the response header at the time t1, the router 405 performs routing processing for the response header, virtual channel allocation, and transfer of the response header by output switch allocation and switching for three cycles. And at the time t4, the router 405 transfers the response header to another router 405 or NIC that follows itself.

At the time t4, the router 405 receives a part of the response data from the NIC 404a while performing the processing described above. And at a time t5, the router 405 receives the rest of the response data. By the time t4, the router 405 has already finished the routing processing, virtual channel allocation, and transfer of the response header by output switch allocation and switching. That is why these response data are output at the times t5 and t6 after the response header H has been output.

In the example illustrated in FIG. 21, the response packet is output from the router 405 during the interval from the time t6 to the time t8.

However, by injecting the response header into the router 405 in advance as in the example illustrated in FIG. 22, the router 405 can start outputting the response packet at the time t4 and can finish outputting it at the time t6. That is to say, according to the configuration of this example, the processing delay of two cycles can be cut down for every response packet and the promptness of response can be increased compared to the example illustrated in FIG. 21.

However, sometimes the NIC 404a may not be notified in advance by the memory controller 406a of the time when the request will be fulfilled. In that case, the timing of outputting the response header from the NIC 404a to the router 405 may be the time when the request order information is received from the memory controller, i.e., the time Tb shown in FIG. 20B. On the other hand, if the NIC 404a may be notified in advance by the memory controller 406a of the time when the request will be fulfilled, then the best timing value may be determined by performing pipeline processing based on the time when the request will be fulfilled completely and the processing delay to be caused by the router 405 that is connected to the NIC 404a. The best timing value may be the time by which the router 405 has gotten ready to transfer the response data, which is earlier than the time when the response data can be injected after the response header and the response data have been output continuously from the router 405. In the example illustrated in FIG. 22, the interval may be adjusted to two cycles. As a result, it is possible to avoid an unwanted situation where only a response header stays in the virtual channels of a following router and where response data associated with the response header has not arrived there yet. Consequently, the delay to be caused by response packet transfer processing can be cut down with the bandwidth used more efficiently.

FIG. 23 shows the best timing of outputting a response header for a three-cycle router, of which the pipeline processing consists of the three stages of routing processing, virtual channel allocation and output switch allocation, and switching. If such a three-cycle router is used, the best timing to output the response header is one cycle before the response data is transmitted as shown in FIG. 23.

Embodiment 2

In the first embodiment described above, the memory controller is supposed to output request order information and the NIC is supposed to get that information. However, if a memory controller with no scheme for providing request order information is used, then the NIC cannot get the request order information.

This second embodiment relates to a configuration which allows the NIC to sense that the order of the response data has been changed even when such a memory controller is used. More specifically, the state of a signal presented by the memory controller to a memory module is detected, thereby sensing any change in the order of response data without getting the memory controller involved.

FIG. 24 illustrates an exemplary configuration for an NIC 414 according to this embodiment. This NIC 414 includes a request order analyzer 2001 for generating request order information unlike the NIC 404*a*, 404*b* of the first embodiment. In FIG. 24, any component also included in the NIC 404*a* of the first embodiment and having substantially the same function and configuration as its counterpart is identified by the same reference numeral. And the following description of the second embodiment will be focused on only differences from the first embodiment.

In the following description, the NIC 414 is supposed to correspond to the NIC 404*a* shown in FIG. 7. However, as in the first embodiment described above, the NIC 414 may also be used as the NIC 404*b*.

(Request Order Analyzer)

The request order analyzer 2001 monitors the state of a signal which is transmitted from the memory controller 426 to the memory 402*a*. Specifically, the request order analyzer 2001 monitors the address information presented by the memory controller 426 to the memory 402*a*. As a result, the request order analyzer 2001 can sense what request data has been submitted by the memory controller 426 to the memory 402*a*. Examples of this request data include a row address, a column address, a bank number and read/write information. Based on these pieces of information, the request order analyzer 2001 compiles request order information indicating the order of requests and provides the request order information for the header order controller 104. The request order analyzer 2001 extracts information to be used to determine the order of requests from the request data that has been de-packetized by the de-packetizing processor 101 of the NIC 414 and sent to the memory controller 426 and stores that information.

FIG. 25 illustrates an exemplary data structure for storing the order of requests. The addresses and read/write information are stored in the order in which the request data have been transferred from the NIC 414 to the memory controller 426.

The request order analyzer 2001 monitors the row address, column address, bank number and read/write information and performs inverse conversion in response to an address strobe signal presented by the memory controller 426 to the memory 402*a*, thereby detecting the address information and the type of the operation requested (i.e., the read/write information) included in the request data.

FIG. 26 shows an exemplary data structure for use to perform inverse conversion on the addresses. The inverse conversion of addresses is the inverse of the processing to be performed in a memory controller to convert the access target address included in request data into row and column addresses in the memory, and may be implemented as conversion logic. If it has turned out, as result of monitoring, that the row address is 80h, the column address is 00h, and the type of the operation requested is write to the memory, the access target address in the request data becomes 8000h by performing the inverse conversion processing shown in FIG. 26 on the addresses. By reference to FIG. 25, it can be seen that request data with Priority Level #2 has been submitted to the memory 2002. And the request order analyzer 2001 can now sense a change in the order of requests. In this case, the request order analyzer 2001 generates the request order information shown in FIG. 14 and transmits it to the header order controller 104. FIG. 27 shows the state of the storage area. The state of the storage area shown in FIG. 25 has been changed into the one shown in FIG. 27.

An interface apparatus according to an aspect of the present disclosure is applicable to a network interface controller (NIC) to be arranged between a bus and a memory on an on-chip bus at an SoC for an integral device, a general-purpose processor, or a local bus on a DSP. Also, methods of operating and controlling that interface apparatus are implementable as an interface processing method and a program for controlling an interface apparatus.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An interface apparatus which connects together a memory controller that is connected to a memory on an integrated circuit and a bus network that has been formed on the integrated circuit,
  wherein the memory controller includes: an arbitrator which provides arbitration in the order of processing of a plurality of request data; and a transmitter which transmits respective response data that have been output from the memory in response to those request data to the interface apparatus, and
  the interface apparatus comprises:
  a de-packetizing processor which performs de-packetize processing on each of the request packets that have been received from the bus network and which extracts and outputs a request header and request data from each said request packet;

a header generator which receives, in a first order, the plurality of request headers that the de-packetizing processor has output, sequentially generates response headers associated with the request headers, and then stores the response headers so that the response headers are read in the first order;

a packetizing processor which generates response packets based on the response data that has been output from the memory in response to the request data and the response headers that are stored in the header generator and which transmits the response packets to the bus network; and a header order controller which controls the header generator so that if the arbitrator has transmitted the plurality of request data to the memory in a second order which is different from the first order, the respective response headers are read in the second order, wherein subsequent to the arbitrator transmitting the plurality of request data to the memory, the arbitrator outputs request order information indicating that the plurality of request data have been transmitted in the second order, the header generator has a storage area in which the order of reading is determined by storage locations, and the header order controller changes the storage locations of the respective response headers in the header generator in accordance with the request order information.

2. The interface apparatus of claim 1, wherein the header order controller gets request order information, indicating that the plurality of request data have been transmitted in the second order, from the arbitrator.

3. The interface apparatus of claim 1, wherein the arbitrator outputs request order information indicating that the plurality of request data have been transmitted in the second order, the header generator stores the respective response headers and their order of reading in association with each other, and the header order controller changes the order of reading in accordance with the request order information.

4. The interface apparatus of claim 2, wherein the header order controller gets the request order information before the packetizing processor gets the response data in response to the request data for which the arbitration has been provided, and controls the header generator so that the response headers are read in the second order.

5. The interface apparatus of claim 1, wherein the interface apparatus is able to transmit the response packets to a router which is connected to the bus network, before the packetizing processor gets the response data in response to the request data for which the arbitration has been provided, the header order controller controls the header generator so that the response headers are read in the second order, the packetizing processor stores in advance router information which is either information about the amount of delay of processing to be carried out by the router on the response headers and the response data or information about the procedure of pipeline processing by the router, and the packetizing processor transmits first the response headers to the router, and then transmits the response data at a time interval which is determined by reference to the router information.

6. An interface apparatus which connects together a memory controller that is connected to a memory on an integrated circuit and a bus network that has been formed on the integrated circuit, wherein the memory controller includes an arbitrator which provides arbitration in the order of processing of a plurality of request data, wherein the interface apparatus comprises:

a de-packetizing processor which performs de-packetize processing on each of the request packets that have been received from the bus network and which extracts and outputs a request header and request data from each said request packet;

a header generator which receives, in a first order, the plurality of request headers that the de-packetizing processor has output, sequentially generates response headers associated with the request headers, and then stores the response headers so that the response headers are read in the first order;

an analyzer which monitors the state of a signal that is sent from the memory controller to the memory to see if the plurality of request data have been transmitted in a second order which is different from the first order;

a packetizing processor which generates response packets based on the response data that has been output from the memory in response to the request data and the response headers that are stored in the header generator and which transmits the response packets to the bus network; and a header order controller which controls the header generator so that if the analyzer has sensed, as a result of an analysis, that the plurality of request data have been transmitted to the memory in the second order that is different from the first order, the respective response headers are read in the second order wherein subsequent to the arbitrator transmitting the plurality of request data to the memory, the arbitrator outputs request order information indicating that the plurality of request data have been transmitted in the second order, the header generator has a storage area in which the order of reading is determined by storage locations, and the header order controller changes the storage locations of the respective response headers in the header generator in accordance with the request order information.

7. The interface apparatus of claim 6, wherein on sensing that the plurality of request data have been transmitted to the memory in the second order, the analyzer gets the request order information.

8. A memory bus system comprising:

a bus network which has been formed on an integrated circuit;

a memory which is arranged on the integrated circuit;

a memory controller which is also arranged on the integrated circuit and connected to the memory; and the interface apparatus of claim 1, which connects the memory controller and the bus network together.

9. The memory bus system of claim 8, further comprising an initiator which is connected to the bus network, wherein the initiator transmits request data requesting an access to the memory and receives response data as a result of the access to the memory.

10. A memory bus system comprising:

a bus network which has been formed on an integrated circuit;

a memory which is arranged on the integrated circuit;

a memory controller which is also arranged on the integrated circuit and connected to the memory; and the interface apparatus of claim 6, which connects the memory controller and the bus network together.

11. The memory bus system of claim 10, further comprising an initiator which is connected to the bus network,
wherein the initiator transmits request data requesting an access to the memory and receives response data as a result of the access to the memory.

12. An interface apparatus which connects together a memory controller that is connected to a memory on an integrated circuit and a bus network that has been formed on the integrated circuit,
wherein the memory controller includes: an arbitrator which provides arbitration in the order of processing of a plurality of request data; and a transmitter which transmits respective response data that have been output from the memory in response to those request data to the interface apparatus, and
the interface apparatus comprises:
a de-packetizing processor which performs de-packetize processing on each of the request packets that have been received from the bus network and which extracts and outputs a request header and request data from each said request packet;
a header generator which receives, in a first order, the plurality of request headers that the de-packetizing processor has output, sequentially generates response headers associated with the request headers, and then stores the response headers so that the response headers are read in the first order;
a packetizing processor which generates response packets based on the response data that has been output from the memory in response to the request data and the response headers that are stored in the header generator and which transmits the response packets to the bus network; and
a header order controller which controls the header generator so that if the arbitrator has transmitted the plurality of request data to the memory in a second order which is different from the first order, the respective response headers are read in the second order,
wherein subsequent to the arbiter transmitting the plurality of request data to the memory, the arbitrator outputs request order information indicating that the plurality of request data have been transmitted in the second order,
the header generator has a storage area in which the order of reading is determined by storage locations, and
the header order controller changes the storage locations of the respective response headers in the header generator in accordance with the request order information,
wherein the header order controller gets the request order information before the packetizing processor gets the response data in response to the request data for which the arbitration has been provided, and controls the header generator so that the response headers are read in the second order.

* * * * *

UNITED STATES PATENT AND TRADEMARK OFFICE
CERTIFICATE OF CORRECTION

| | |
|---|---|
| PATENT NO. | : 10,225,168 B2 |
| APPLICATION NO. | : 14/468653 |
| DATED | : March 5, 2019 |
| INVENTOR(S) | : Tomoki Ishii et al. |

Page 1 of 1

It is certified that error appears in the above-identified patent and that said Letters Patent is hereby corrected as shown below:

On the Title Page

Item (73), The Assignee is currently listed as:
"Panasonic Intellectual Property Management Co. Ltd"
And it should read:
--- Panasonic Intellectual Property Management Co., Ltd. ---

Signed and Sealed this
Twenty-first Day of April, 2020

Andrei Iancu
*Director of the United States Patent and Trademark Office*